US012689484B2

(12) United States Patent
Elshafie et al.

(10) Patent No.: US 12,689,484 B2
(45) Date of Patent: Jul. 21, 2026

(54) SOUNDING REFERENCE SIGNAL REPETITION WITH CANCELED OR BLOCKED SYMBOL

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/549,267

(22) PCT Filed: Feb. 22, 2022

(86) PCT No.: PCT/US2022/070764
§ 371 (c)(1),
(2) Date: Sep. 6, 2023

(87) PCT Pub. No.: WO2022/198162
PCT Pub. Date: Sep. 22, 2022

(65) Prior Publication Data
US 2024/0171351 A1 May 23, 2024

(30) Foreign Application Priority Data
Mar. 16, 2021 (GR) ............................... 20210100159

(51) Int. Cl.
*H04L 5/00* (2006.01)

(52) U.S. Cl.
CPC .......... *H04L 5/0051* (2013.01); *H04L 5/0017* (2013.01)

(58) Field of Classification Search
CPC ....... H04L 1/08; H04L 5/0017; H04L 5/0051; H04L 5/0091
See application file for complete search history.

(56) References Cited

U.S. PATENT DOCUMENTS

2020/0351897 A1* 11/2020 Fakoorian ............. H04L 5/0096

FOREIGN PATENT DOCUMENTS

WO          2022109597 A1      5/2022

OTHER PUBLICATIONS

CATT: "Discussion on SRS Enhancement for Rel-17", 3GPP TSG RAN WG1 #104-e, R1-2100348, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 17 Pages, XP051970951, Sections 1-5, p. 6, paragraph 3 tables 1-3, p. 12, paragraph 4.1.
(Continued)

*Primary Examiner* — Mansour Oveissi
(74) *Attorney, Agent, or Firm* — Harrity & Harrity, LLP

(57)          ABSTRACT

Various aspects of the present disclosure generally relate to wireless communication. In some aspects, a user equipment (UE) may receive a message indicating that a symbol for a repetition of a sounding reference signal (SRS) resource in a first slot is canceled or blocked. The UE may drop transmission of one or more other symbols for the SRS resource in the first slot based at least in part on the message. Numerous other aspects are described.

28 Claims, 22 Drawing Sheets

1000 ⟶

(56) References Cited

OTHER PUBLICATIONS

Intel Corporation: "Discussion on SRS Enhancements", 3GPP TSG RAN WG1 Meeting #104-e, 3GPP Draft, R1-2100641, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), pp. 1-15, XP051971111.

International Search Report and Written Opinion—PCT/US2022/070764—ISA/EPO—Jun. 1, 2022.

Qualcomm Incorporated: "Discussion on SRS Enhancement," 3GPP TSG-RAN WG1 Meeting #104-e, R1-2101451, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), 41 Pages, XP051971616.

SAmsung: "Enhancements on SRS", 3GPP TSG RAN WG1 #104-e, 3GPP Draft, R1-2101191, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), 6 Pages, XP051971405.

* cited by examiner

502

OFDM symbol index

OFDM symbol index

500

UE 1    1  1

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   |   |   |   |   |   |   | S | S | G | S | S |
|   |   |   |   |   |   |   |   |   | R | R | U | R | R |
|   |   |   |   |   |   |   |   |   | S | S | A | S | S |
|   |   |   |   |   |   |   |   |   | # | # | R | # | # |
|   |   |   |   |   |   |   |   |   | 1 | 1 | D | 2 | 2 |

OFDM symbol index slot (n)

902

UE 2    1  -1

| 0 | 1 | 2 | 3 | 4 | 5 | 6 | 7 | 8 | 9 | 10 | 11 | 12 | 13 |
|---|---|---|---|---|---|---|---|---|---|----|----|----|----|
|   |   |   |   |   |   |   |   |   | S | S | G | S | S |
|   |   |   |   |   |   |   |   |   | R | R | U | R | R |
|   |   |   |   |   |   |   |   |   | S | S | A | S | S |
|   |   |   |   |   |   |   |   |   | # | # | R | # | # |
|   |   |   |   |   |   |   |   |   | 1 | 1 | D | 2 | 2 |

OFDM symbol index slot (n)

904

900

OCC matrix

1600

1700

Receive a message indicating that a symbol for a repetition of a sounding reference signal (SRS) resource in a first slot is canceled or blocked

1910

Drop transmission of one or more other symbols for the SRS resource in the first slot based at least in part on the message

1920

1900

2000

2010 — Transmit, to a UE, a message indicating that a symbol for a repetition of an SRS resource in a first slot is canceled or blocked 2020 — Receive, in one or more of the first slot or one or more later slots, repetitions of the SRS resource for one or more other symbols that were dropped by the UE, until reception of the SRS resource is complete

SOUNDING REFERENCE SIGNAL REPETITION WITH CANCELED OR BLOCKED SYMBOL

CROSS-REFERENCE TO RELATED APPLICATIONS

This patent application is a 371 national stage of PCT Application No. PCT/US2022/070764, filed on Feb. 22, 2022, entitled "SOUNDING REFERENCE SIGNAL REPETITION WITH CANCELED OR BLOCKED SYMBOL," which claims priority to Greece Patent Application Serial No. 20210100159, filed on Mar. 16, 2021, entitled "SOUNDING REFERENCE SIGNAL REPETITION WITH CANCELED OR BLOCKED SYMBOL," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for sounding reference signal repetition with a canceled or blocked symbol.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a message indicating that a symbol for a repetition of a sounding reference signal (SRS) resource in a first slot is canceled or blocked, and dropping transmission of one or more other symbols for the SRS resource in the first slot based at least in part on the message.

In some aspects, a method of wireless communication performed by a network entity includes transmitting, to a UE, a message indicating that a symbol for a repetition of an SRS resource in a first slot is canceled or blocked, and receiving, in one or more of the first slot or one or more later slots, repetitions of the SRS resource for one or more other symbols that were dropped by the UE, until reception of the SRS resource is complete.

In some aspects, a UE for wireless communication includes a memory and one or more processors, coupled to the memory, configured to receive a message indicating that a symbol for a repetition of an SRS resource in a first slot is canceled or blocked, and drop transmission of one or more other symbols for the SRS resource in the first slot based at least in part on the message.

In some aspects, a network entity for wireless communication includes a memory and one or more processors, coupled to the memory, configured to transmit, to UE, a message indicating that a symbol for a repetition of an SRS resource in a first slot is canceled or blocked, and receive, in one or more of the first slot or one or more later slots, repetitions of the SRS resource for one or more other symbols that were dropped by the UE, until reception of the SRS resource is complete.

In some aspects, a non-transitory computer-readable medium storing a set of instructions for wireless communication includes one or more instructions that, when executed by one or more processors of a UE, cause the UE to receive a message indicating that a symbol for a repetition of an SRS resource in a first slot is canceled or blocked, and drop transmission of one or more other symbols for the SRS resource in the first slot based at least in part on the message.

In some aspects, a non-transitory computer-readable medium storing a set of instructions for wireless communication includes one or more instructions that, when executed by one or more processors of a network entity, cause the network entity to: transmit, to a UE, a message indicating that a symbol for a repetition of an SRS resource in a first slot is canceled or blocked, and receive, in one or more of the first slot or one or more later slots, repetitions of the SRS resource for one or more other symbols that were dropped by the UE, until reception of the SRS resource is complete.

In some aspects, an apparatus for wireless communication includes means for receiving a message indicating that a symbol for a repetition of an SRS resource in a first slot is canceled or blocked, and means for dropping transmission of one or more other symbols for the SRS resource in the first slot based at least in part on the message.

In some aspects, an apparatus for wireless communication includes means for transmitting, to a UE, a message indicating that a symbol for a repetition of an SRS resource in a first slot is canceled or blocked, and means for receiving, in one or more of the first slot or one or more later slots, repetitions of the SRS resource for one or more other symbols that were dropped by the UE, until reception of the SRS resource is complete.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
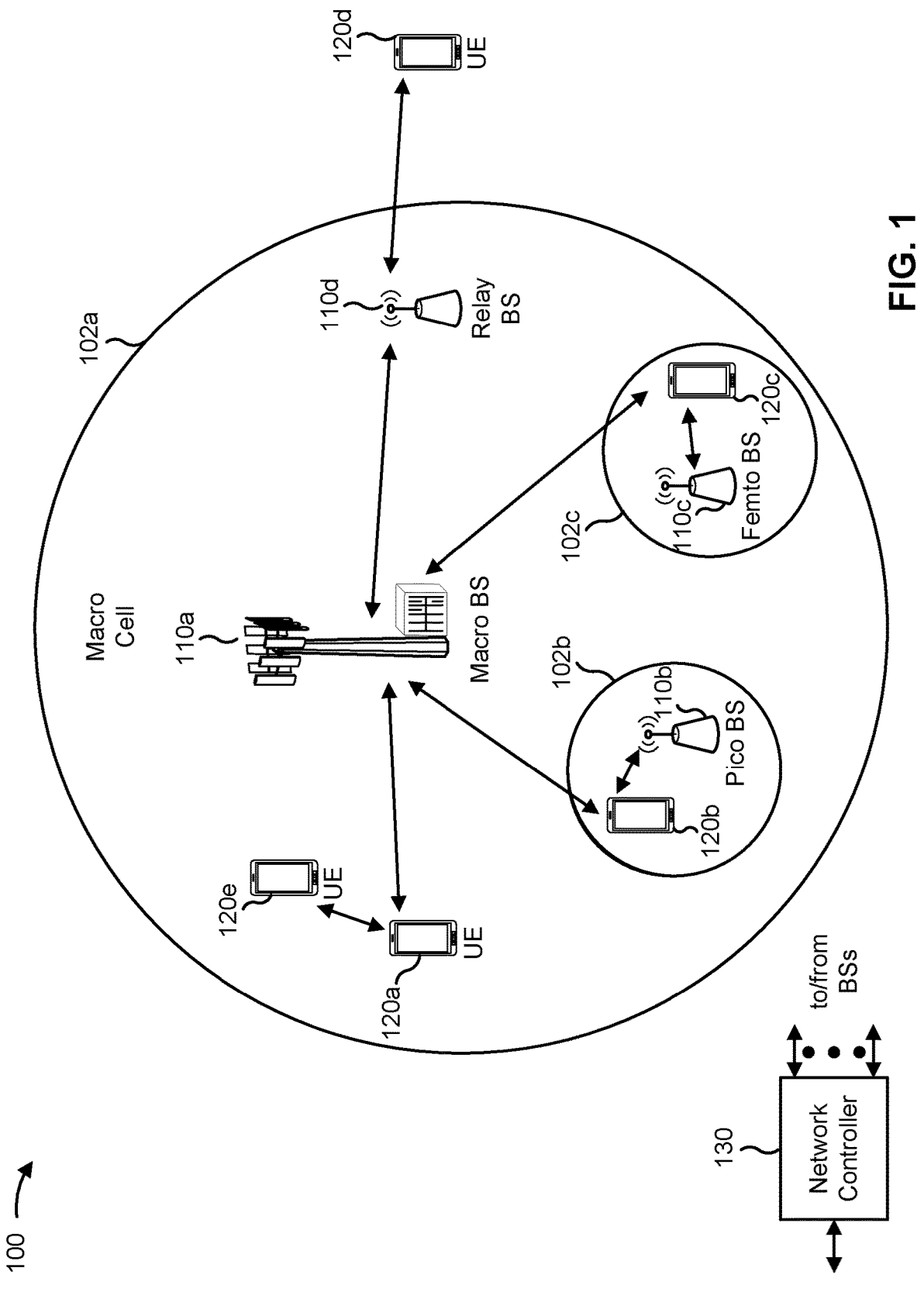
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "CNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrow band internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
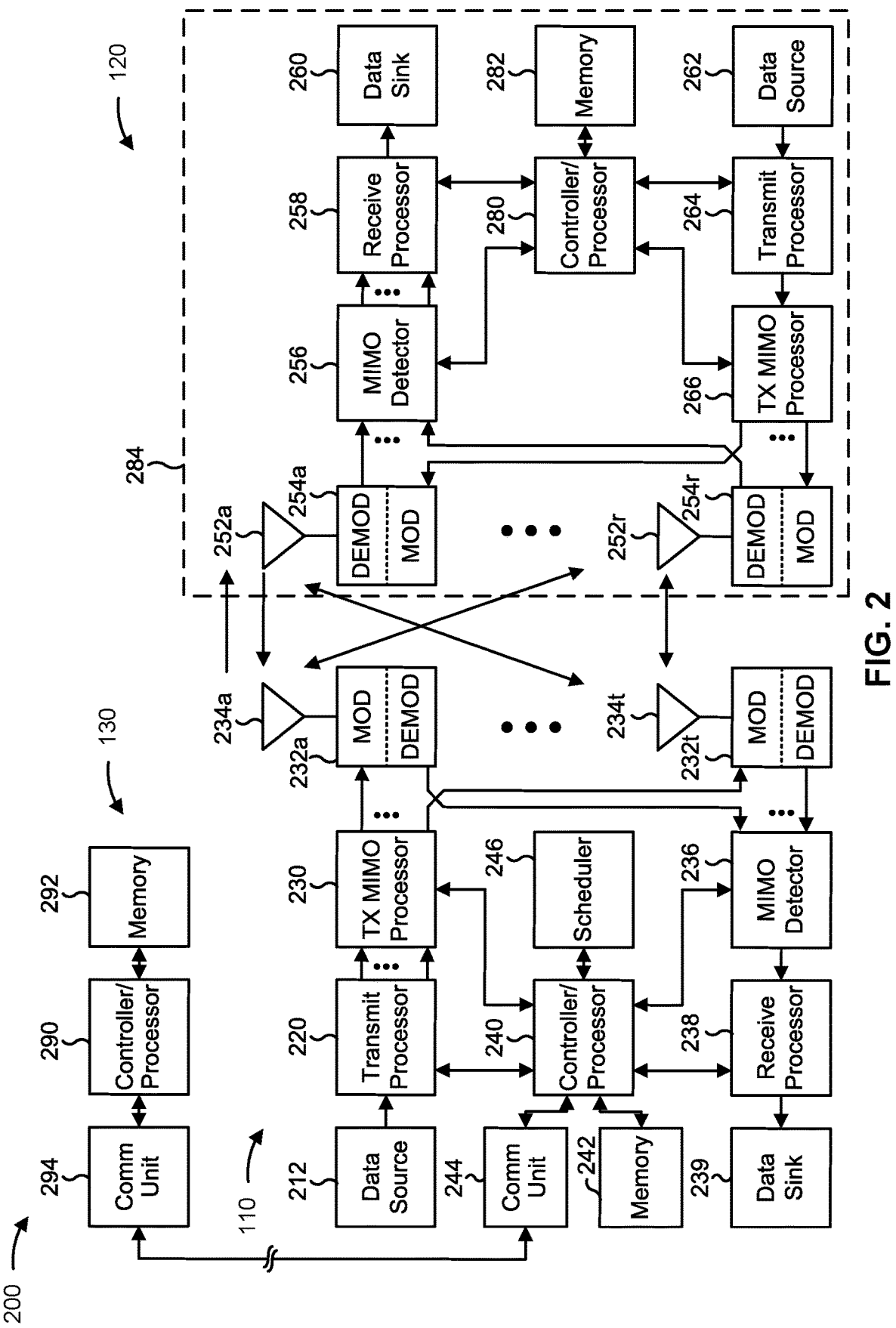
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-22).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-22).

Controller/processor 240 of base station 110, controller/processor 280 of UE 120, and/or any other component(s) of FIG. 2 may perform one or more techniques associated with sounding reference signal (SRS) repetition with a canceled or blocked symbol, as described in more detail elsewhere herein. For example, controller/processor 240 of base station 110, controller/processor 280 of UE 120, and/or any other component(s) of FIG. 2 may perform or direct operations of, for example, process 1900 of FIG. 19, process 2000 of FIG. 20, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1900 of FIG. 19, process 2000 of FIG. 20, and/or other processes as described herein. In some aspects, executing instructions may include running the instructions, converting the instructions, compiling the instructions, and/or interpreting the instructions, among other examples.

In some aspects, the UE 120 includes means for receiving a message indicating that a symbol for a repetition of an SRS resource in a first slot is canceled or blocked, and/or means for dropping transmission of one or more other symbols for the SRS resource in the first slot based at least in part on the message. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for using a time domain orthogonal cover code (TD-OCC) matrix repetition size that is equal to a repetition size of whichever of the one or more of the first group of repetitions or the second group of repetitions is transmitted.

In some aspects, the UE 120 includes means for receiving a first index for an OCC matrix of an original repetition size, and/or means for using a second index for the TD-OCC matrix repetition size, where the second index is smaller than the first index and based at least in part on the first index.

In some aspects, the UE 120 includes means for using different indices for different repetition sizes. In some aspects, the UE 120 includes means for using a common index for each repetition size. In some aspects, the UE 120 includes means for transmitting repetitions of the SRS resource for the dropped one or more other symbols in one or more of the first slot or one or more later slots until transmission of the SRS resource is complete. In some aspects, the UE 120 includes means for transmitting repetitions of the SRS resource for the dropped one or more other symbols in semi-static uplink slots until transmission of the SRS resource is complete. In some aspects, the UE 120 includes means for transmitting repetitions of the SRS resource for the dropped one or more other symbols, or for all the repetitions of the SRS resource, in a second slot. In some aspects, the UE 120 includes means for transmitting repetitions of the SRS resource for the dropped one or more other symbols until an expected quantity of repetitions for the SRS resource have been transmitted. In some aspects, the UE 120 includes means for transmitting repetitions of the SRS resource for the dropped one or more other symbols or to search for available slots for repetitions of the SRS resource until a timer expires or until a counter satisfies a counter threshold.

In some aspects, the base station 110 includes means for transmitting, to a UE, a message indicating that a symbol for a repetition of an SRS resource in a first slot is canceled or blocked, and/or means for receiving, in one or more of the first slot or one or more later slots, repetitions of the SRS resource for one or more other symbols that were dropped by the UE, until reception of the SRS resource is complete. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for processing received repetitions with a TD-OCC matrix repetition size that is equal to a repetition size of whichever of the one or more of the first group of repetitions or the second group of repetitions is transmitted.

In some aspects, the base station 110 includes means for transmitting a first index for an OCC matrix of an original repetition size, and/or means for receiving repetitions with a second index that corresponds to the TD-OCC matrix repetition size, wherein the second index is smaller than the first index.

In some aspects, the base station 110 includes means for using different indices for different repetition sizes. In some aspects, the base station 110 includes means for using a common index for each repetition size. In some aspects, the base station 110 includes means for using different orthogonal cover code repetition sizes for groups of repetitions from different UEs. In some aspects, the base station 110 includes means for receiving repetitions of the SRS resource for the dropped one or more other symbols until an expected quantity of repetitions for the SRS resource is satisfied.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
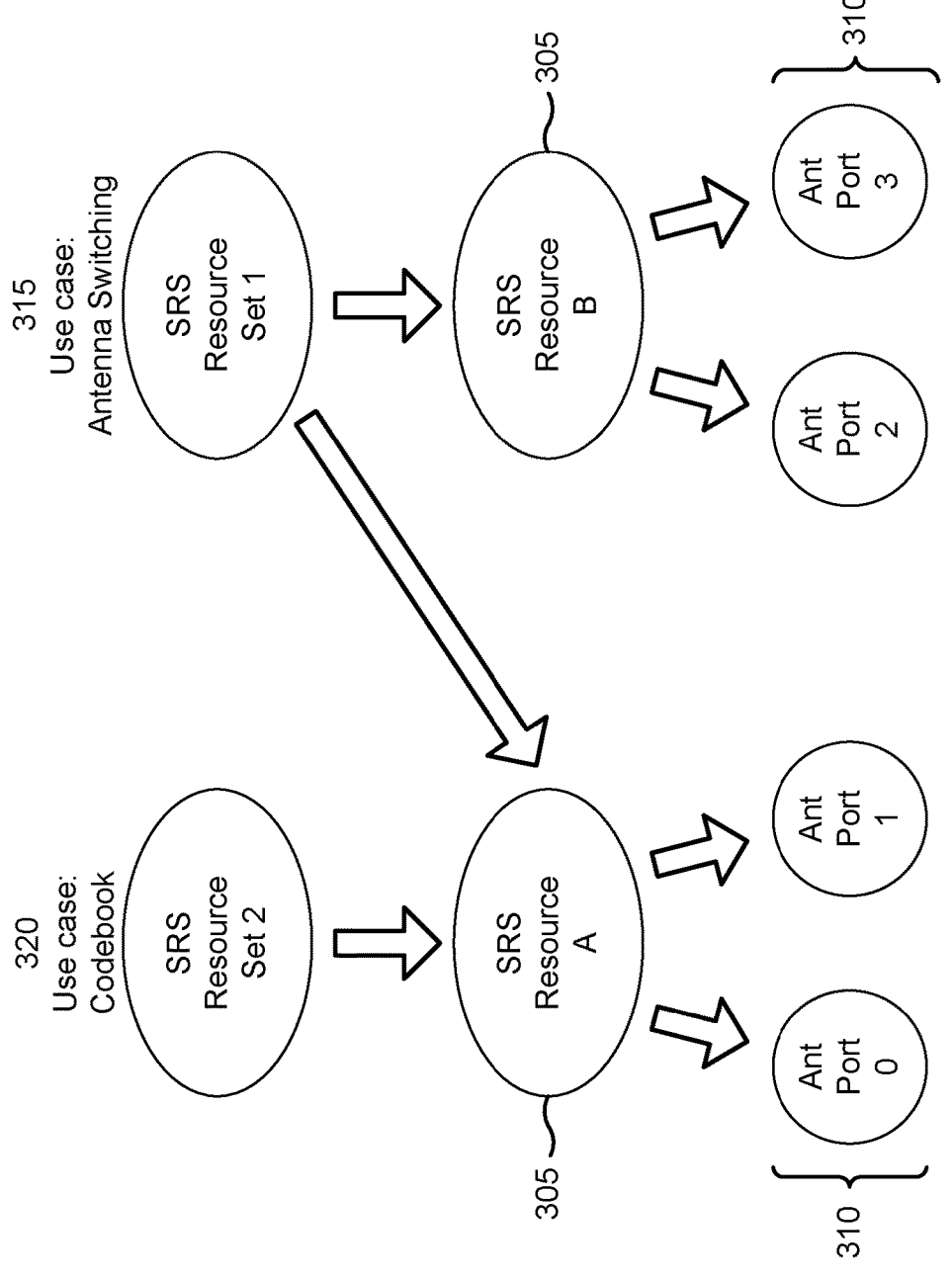
FIG. 3 is a diagram illustrating an example of sounding reference signal (SRS) resource sets, in accordance with the present disclosure.

FIG. 3 is a diagram illustrating an example 300 of SRS resource sets, in accordance with the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 305, an SRS resource set may include one or more resources (e.g., shown as SRS resources), which may include time resources and/or frequency resources (e.g., a slot, a symbol, a resource block, and/or a periodicity for the time resources).

As shown by reference number 310, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC CE)). An aperiodic SRS resource may be triggered dynamically, such as via downlink control information (DCI) (e.g., UE-specific DCI or group common DCI) or a MAC CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 3, in some aspects, different SRS resource sets indicated to the UE 120 (e.g., having different use cases) may overlap (e.g., in time and/or in frequency, such as in the same slot). For example, as shown by reference number 315, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 320, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 3 is provided as an example. Other examples may differ from what is described with regard to FIG. 3.

Figure 4:
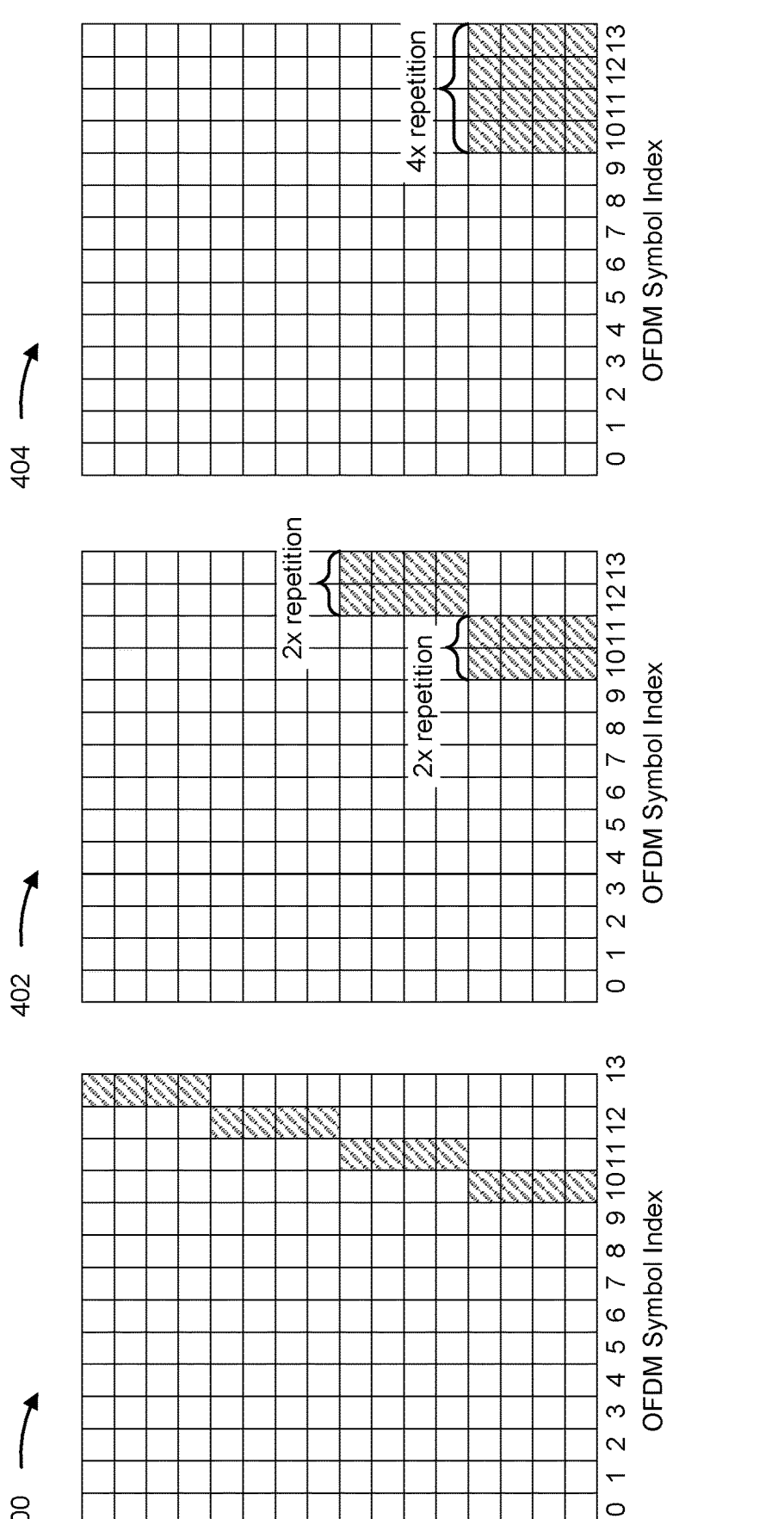
FIG. 4 is a diagram illustrating examples of SRS repetition, in accordance with the present disclosure.

FIG. 4 is a diagram illustrating examples 400, 402, and 404 of SRS repetition, in accordance with the present disclosure.

As part of SRS enhancements for antenna switching, an SRS resource may be repeated across a quantity of consecutive SRS symbols. Each SRS resource may be configured with a repetition factor (e.g., 1, 2, 4). Example 400 shows a repetition factor of 1, example 402 shows a repetition factor of 2, and example 404 shows a repetition factor of 4.

A UE may transmit SRS resources in a comb pattern. For example, if there are 12 resource elements (REs) in a slot, the UE may transmit SRS resources every other RE of the 12 REs for a comb-2 pattern and every fourth RE for a comb-4 pattern. Cyclic shifts for the SRS resources may be the same or may differ.

As indicated above, FIG. 4 provides some examples. Other examples may differ from what is described with regard to FIG. 4.

Figure 5:
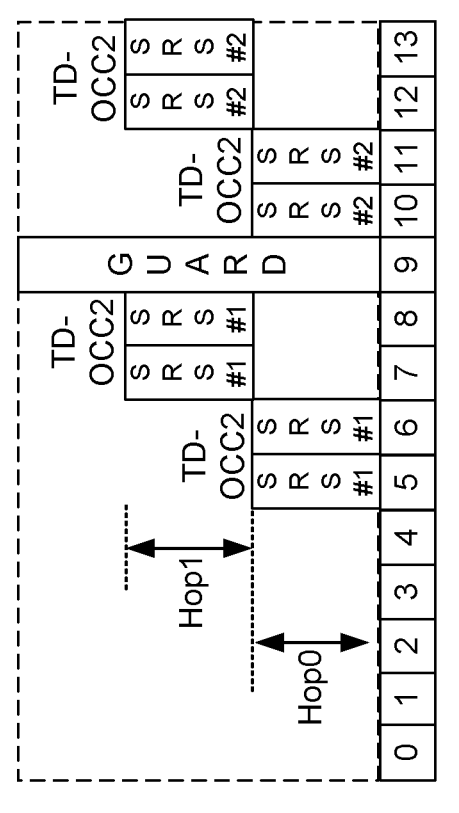
FIG. 5 is a diagram illustrating examples of patterns for SRS resources, in accordance with the present disclosure.
Figure 5:
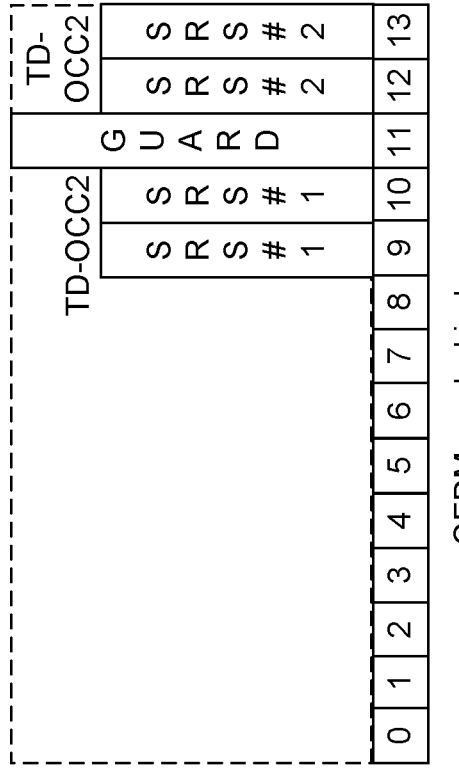

FIG. 5 is a diagram illustrating examples 500 and 502 of patterns for SRS resources, in accordance with the present disclosure.

Example 500 shows a first SRS resource (SRS 1) with two repetitions in symbols 9 and 10, a guard symbol in symbol 11, and a second SRS resource (SRS 2) with two repetitions in symbols 12 and 13.

In some aspects, an SRS resource may be repeated across N consecutive symbols with a time domain orthogonal cover code (TD-OCC) sequence of length N. TD-OCC may be a scheme where multiple UEs use specific codes to transmit and receive multiple orthogonal signals in the same time-frequency resources. For example, if two antenna ports are to use the same symbols and the same frequency resources, the two antenna ports may use different codes or cyclic shifts of a TD-OCC sequence (e.g., TD-OCC2) to sound the SRSs so that the base station can distinguish the SRSs from different UEs. TD-OCC will be explained in more detail in connection with FIG. 9.

Frequency hopping may be used for repetitions of an SRS resource. For example, a UE may transmit an SRS resource across N consecutive symbols for each of M frequency hops. Each hop may include N/M symbols. Example 500 shows no frequency hopping, while example 502 shows intra-slot frequency hopping (within a slot) with SRS 1 repetitions in a first frequency hop 0 and SRS 1 repetitions at a second frequency hop 1. Example 502 also shows a guard symbol between SRS 2 repetitions as the first frequency hop 0 and SRS 2 repetitions at the second frequency hop 1. Example 502 shows that the UE may transmit an SRS resource across 4 symbols, with a TD-OCC2 sequence within each hop.

As indicated above, FIG. 5 provides some examples. Other examples may differ from what is described with regard to FIG. 5.

Figure 6:
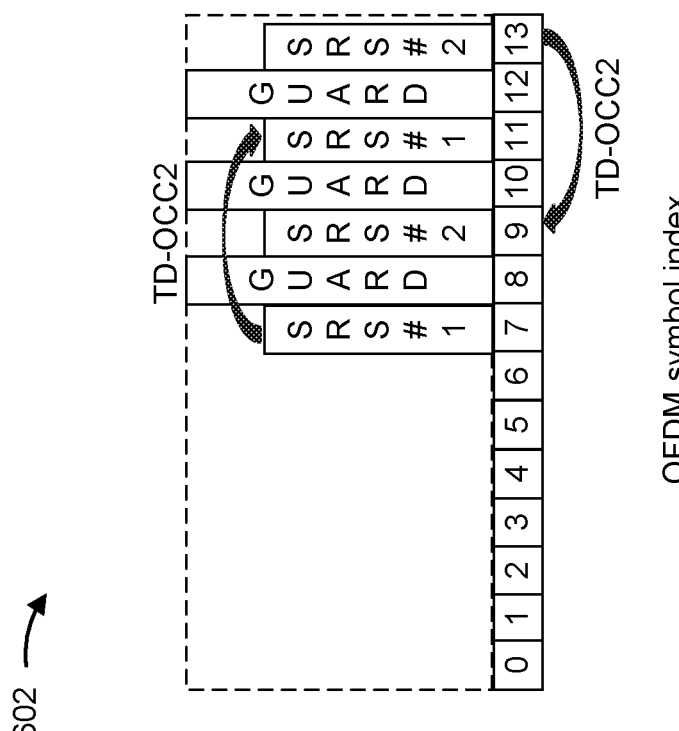
FIG. 6 is a diagram illustrating examples of interlaced time domain orthogonal cover code (TD-OCC) patterns, in accordance with the present disclosure.
Figure 6:
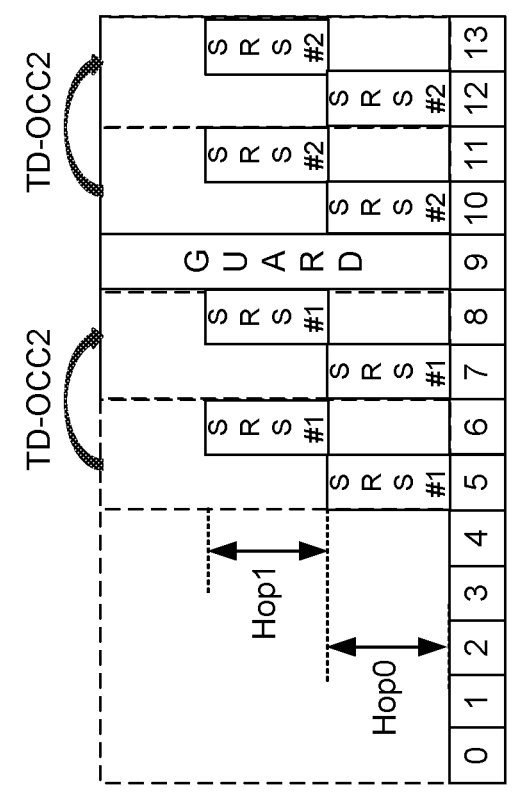

FIG. 6 is a diagram illustrating examples 600 and 602 of interlaced TD-OCC patterns, in accordance with the present disclosure.

TD-OCC symbols may be non-consecutive symbols. Example 600 shows that symbols 5 and 7 are part of the same TD-OCC2 sequence, and that symbols 6 and 8 are part of the same TD-OCC2 sequence. Example 602 shows that symbols 7 and 11 are part of the same TD-OCC2 sequence and that symbols 9 and 13 are part of the same TD-OCC2 sequence. Note that while the UE may use guard symbols, the base station may utilize these guard symbols for other communications, such as an SRS from another UE.

As indicated above, FIG. 6 provides some examples. Other examples may differ from what is described with regard to FIG. 6.

Figure 7:
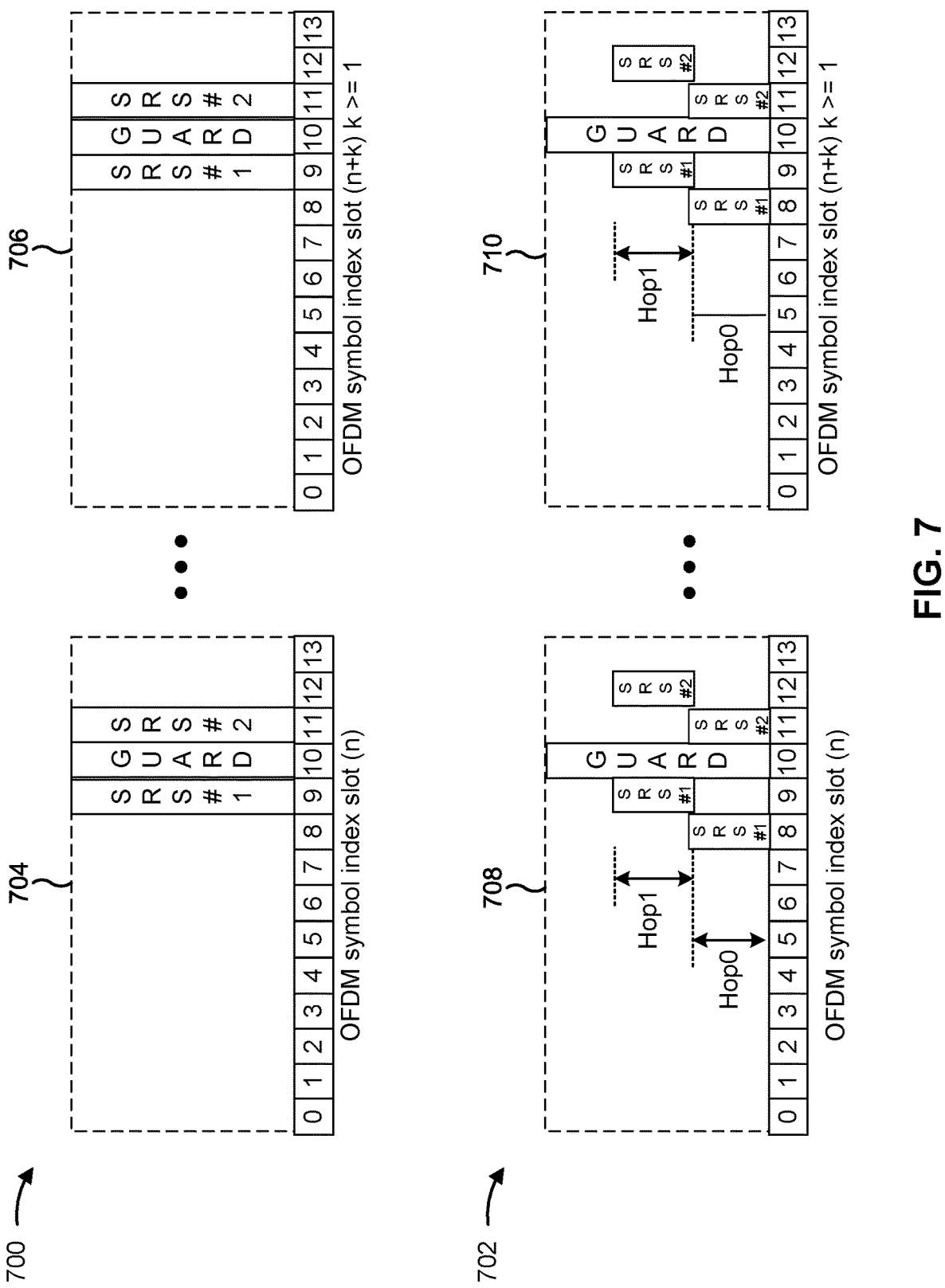
FIG. 7 is a diagram illustrating examples of inter-slot TD-OCC patterns, in accordance with the present disclosure.

FIG. 7 is a diagram illustrating examples 700 and 702 of inter-slot TD-OCC patterns, in accordance with the present disclosure.

In some aspects, a TD-OCC sequence may be configured across multiple slots and referred to as inter-slot TD-OCC. For example, two slots 704 and 706 may be slot n and slot n+k (k≥1). In other words, the two slots 704 and 706 may be consecutive slots or non-consecutive slots. Example 700 shows an inter-slot TD-OCC pattern with no frequency hopping, where a first SRS resource (SRS 1) is in a TD-OCC2 sequence across two slots. A second SRS resource (SRS 2) is also in a TD-OCC2 sequence across two slots. Symbol 9 in the slot 704 and symbol 9 in the slot 706 are in the same TD-OCC2 sequence. Symbol 11 in the slot 704 and symbol 11 in the slot 706 are in the same TD-OCC2 sequence. While TD-OCC symbols may be spread across multiple slots, it may be easier to maintain coherency if the TD-OCC symbols are in the same slot.

Example 702 shows intra-slot frequency hopping in each of the slots 708 and 710. Symbols 8 and 9 in the slots 708 and 710 are in the same TD-OCC2 sequence, and symbols 11 and 12 in the slots 708 and 710 are in the same TD-OCC2 sequence.

As indicated above, FIG. 7 provides some examples. Other examples may differ from what is described with regard to FIG. 7.

Figure 8:
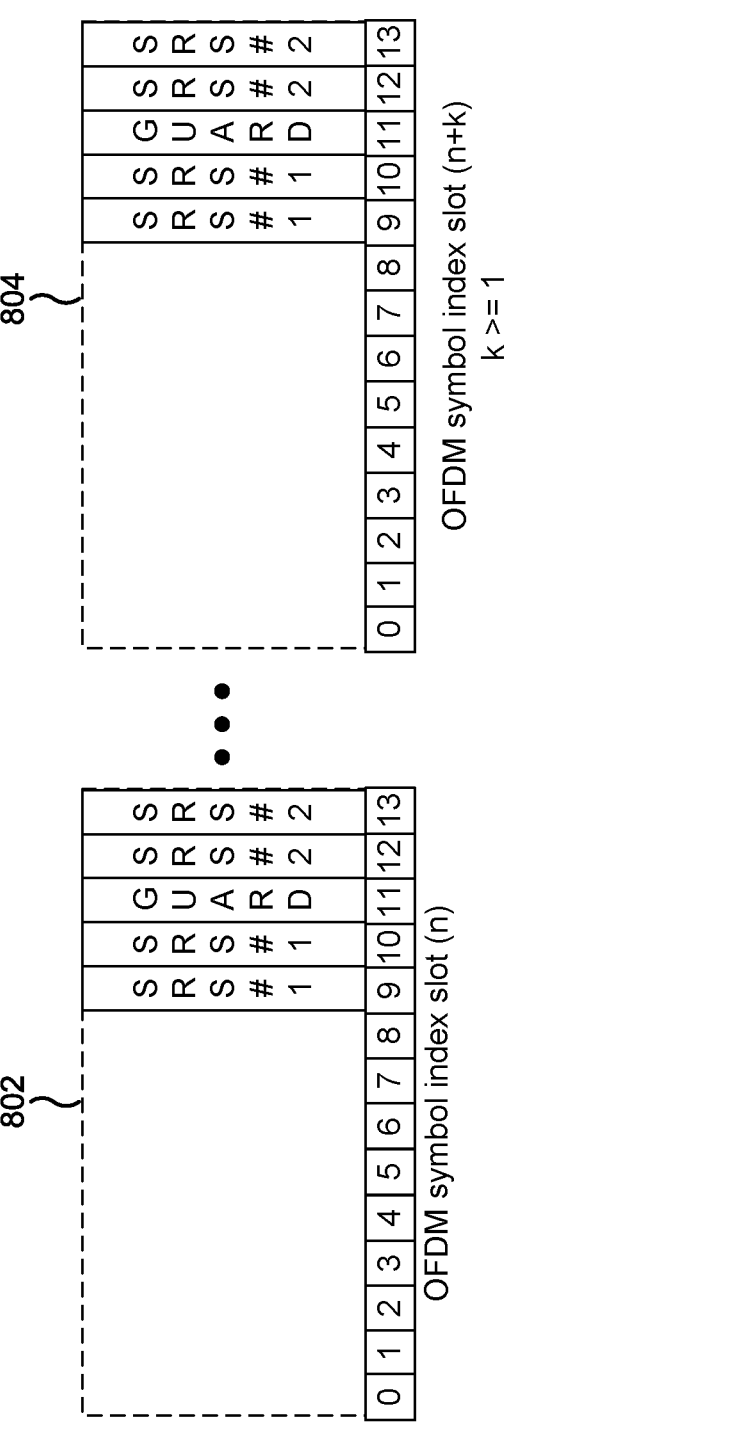
FIG. 8 is a diagram illustrating an example of another TD-OCC pattern, in accordance with the present disclosure.

FIG. 8 is a diagram illustrating an example 800 of another TD-OCC pattern, in accordance with the present disclosure.

An SRS resource may be repeated within the slots (intra-slot) and across slots (inter-slot) with a TD-OCC sequence. The UE may transmit the SRS resource in consecutive slots or non-consecutive slots, and with frequency hopping (intra-slot or inter-slot) or without frequency hopping. Example 800 shows that a UE may transmit a first SRS resource (SRS 1) across 4 symbols (symbols 9 and 10 in the slots 802 and 804) using a TD-OCC4 sequence. The slots 802 and 804 may be consecutive slots or non-consecutive slots. The UE may transmit a second SRS resource (SRS 2) across the slots 802 and 804 using the TD-OCC4 sequence.

As indicated above, FIG. 8 is provided as an example. Other examples may differ from what is described with regard to FIG. 8.

Figure 9:
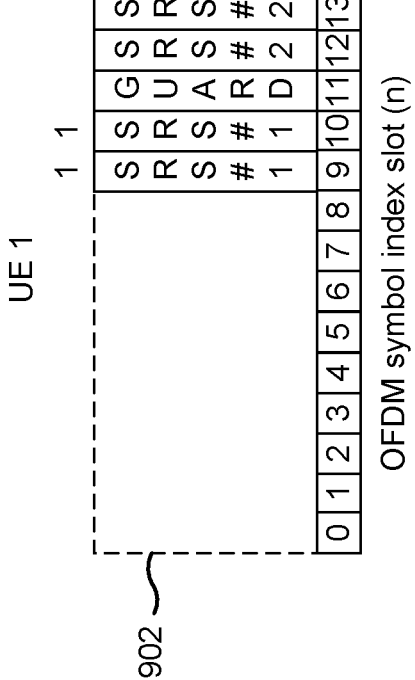
FIG. 9 is a diagram illustrating an example of TD-OCC, in accordance with the present disclosure.
Figure 9:
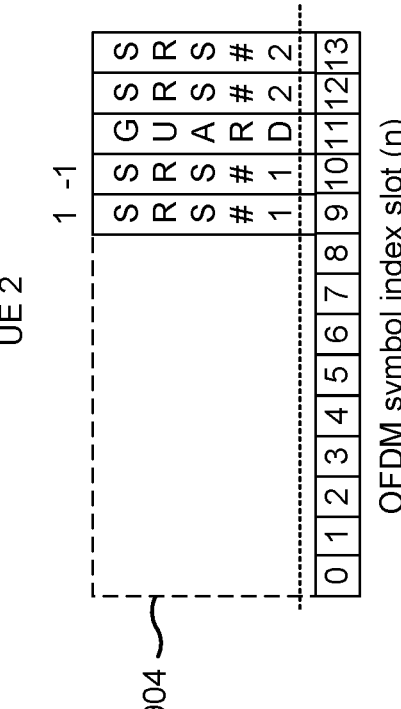

FIG. 9 is a diagram illustrating an example 900 of TD-OCC, in accordance with the present disclosure.

In a TD-OCC scheme, multiple UEs may each use different codes to help a base station to distinguish the signals (e.g., SRSs) from the UEs. Each of the UEs may multiply a signal by a Walshi sequence to obtain a Walshi matrix, which, for two UEs and two antennas, may form a combined signal represented by an OCC matrix $$\begin{bmatrix} 1 & 1 \\ 1 & -1 \end{bmatrix}.$$

Each UE is represented by a row of the OCC matrix. The combined signal may also be a DFT matrix.

Example 900 shows codes for symbols in a first slot 902 of a first UE (UE 1) with a 2T4R (2 transmit antennas, 4 receive antennas) configuration, which includes 2 SRS resources (SRS 1 and SRS 2) in an SRS resource set. Each SRS resource may be for two antenna ports and transmitted on different symbols. UE 1 may use codes with values 1 and 1 for each repetition of SRS 1 in symbols 9 and 10. Example 900 shows codes for symbols in a second slot 904 of a second UE (UE 2) with values 1 and −1 for SRS 2 repetitions in the same symbols 9 and 10.

If a base station receives a first signal x from UE 1, represented as matrix $$\begin{bmatrix} 1 \\ 1 \end{bmatrix} x,$$

and a second, orthogonal signal from UE 2, represented as matrix $$\begin{bmatrix} 1 \\ -1 \end{bmatrix} y,$$

the base station may multiply the signals by $$\begin{bmatrix} 1 \\ 1 \end{bmatrix}$$

such that $$\begin{bmatrix} 1 \\ -1 \end{bmatrix} y$$

is canceled, leaving only signal x, which is the signal for UE 1. To decode the signal y from UE 2, the base station may multiply the signals by $$\begin{bmatrix} 1 \\ -1 \end{bmatrix}$$

to cancel the signal from UE 1, leaving only signal y from UE 2. That is, the base station uses the conjugate of whatever a UE is using to remove a TD-OCC sequence and to receive a corresponding signal from the UE. This may increase the capacity of the network, because multiple UEs are using the same time-frequency resources. The base station may begin a channel estimation process with the received signals. In some scenarios, this signaling may be used for multiple antennas of the same UE.

The base station uses the 2 codes for each SRS to distinguish the SRSs. However, there may be an issue if the base station does not receive one of the symbols. If a signal in symbol 10 is not received because the uplink (U) symbol 10 was canceled or collided with a downlink (D) or flex (F) symbol, the base station may not receive the code in symbol 10. If the base station does not have both codes of a 2 code TD-OCC sequence, the base station may not be able to distinguish the SRSs from UE 1 and UE 2. That is, the base station may not be able to decouple the signal x from UE 1 and the signal y from UE 2. Symbol 10 would have been used to cancel out the other symbols, but with only symbol 9, there is no cancelation (only x+y and no x−y due to 1+−1). For example, the base station may have transmitted a slot format indicator (SFI) that changed symbol 10 from a U to a D, but UE 1 missed the SFI (e.g., the SFI was in group-common downlink control information (DCI)) and now the base station may not be able to decouple signal x or signal y from a combined signal from UE 1 and UE 2 in symbol 10. If the base station cannot identify signals from UE 1 and UE 2, the signal transmitted in symbol 9 is also wasted. That is, SRS repetition with a missing symbol may cause the UE to waste time, power, processing resources, and signaling resources to retransmit an SRS in other symbols. Furthermore, if the SRS is not reliable, UE 1 may be assigned to other tasks.

As indicated above, FIG. 9 is provided as an example. Other examples may differ from what is described with regard to FIG. 9.

Figure 10:
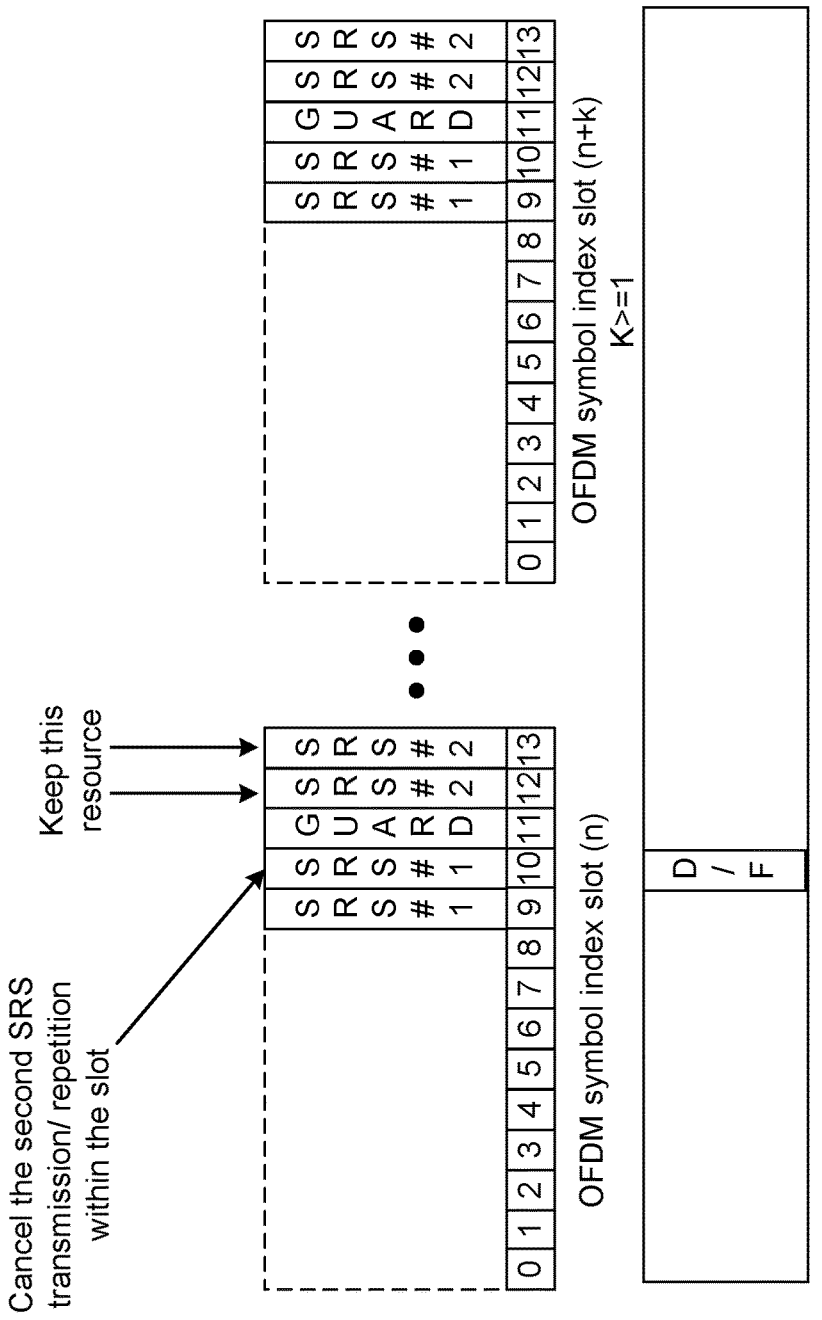
FIG. 10 is a diagram illustrating an example of SRS repetition with a canceled or blocked symbol, in accordance with the present disclosure.

FIG. 10 is a diagram illustrating an example 1000 of SRS repetition with a canceled or blocked symbol, in accordance with the present disclosure.

Example 1000 shows that symbol 10 is canceled, due to a collision with a D or F symbol. The UE may have received an SFI in DCI Format 2_0 or received an uplink cancellation indicator (ULCI) in DCI Format 2_4. A current procedure is to continue with repetitions of another SRS resource. However, if TD-OCC is applied, there is no reason to keep or use information from symbol 9 or from SRS repetition in other symbols that are part of the same TD-OCC sequence, because the base station is not able to distinguish signals from different UEs or from different antennas. The UE is wasting power, processing resources, and signaling resources transmitting the other symbols that are part of the same TD-OCC sequence.

As indicated above, FIG. 10 is provided as an example. Other examples may differ from what is described with regard to FIG. 10.

Figure 11:
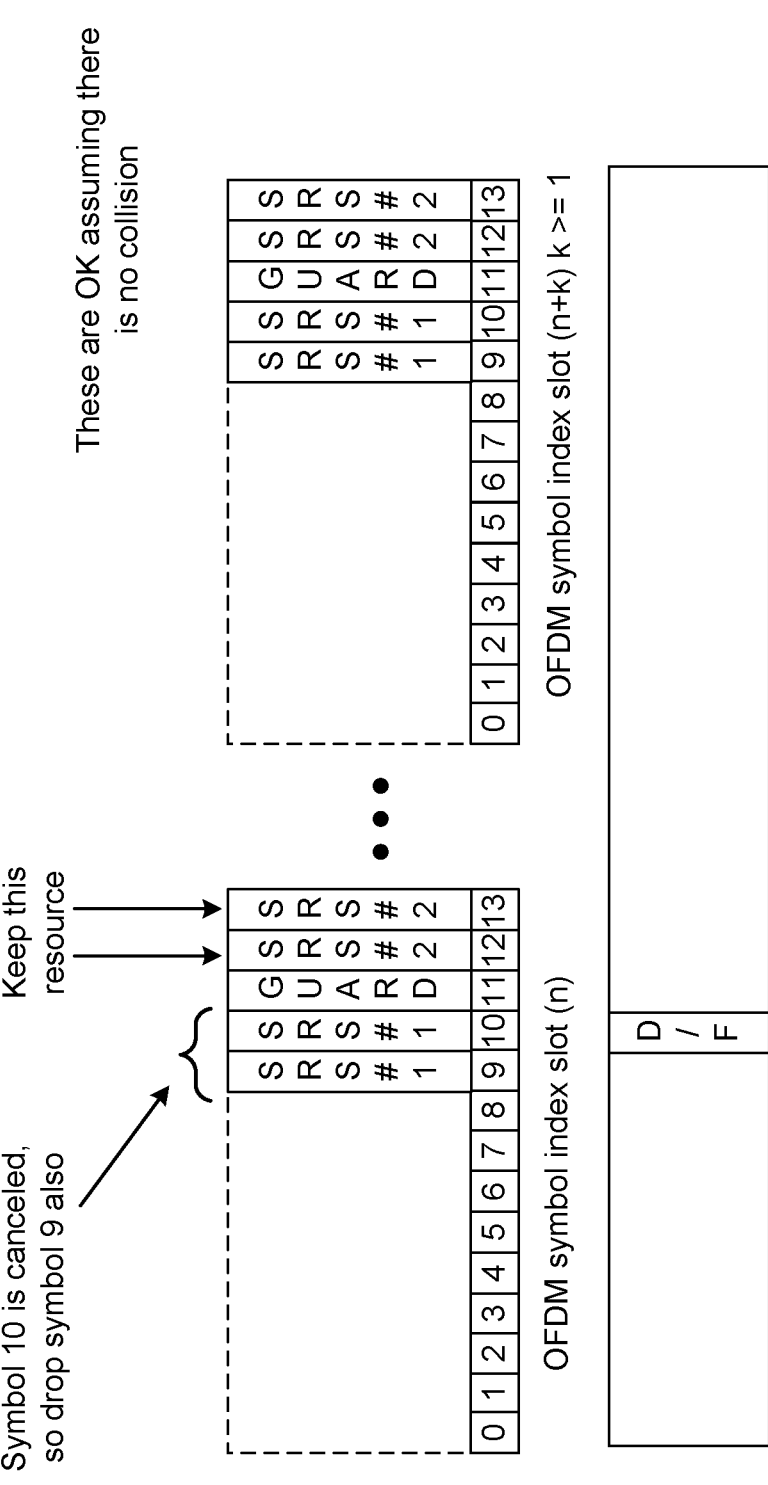
FIG. 11 is a diagram illustrating an example of SRS repetition with a canceled or blocked symbol, in accordance with the present disclosure.

FIG. 11 is a diagram illustrating an example 1100 of SRS repetition with a canceled or blocked symbol, in accordance with the present disclosure.

According to various aspects described herein, instead of transmitting other symbols for repetitions of the SRS repetition or TD-OCC sequence if a symbol is canceled by an ULCI or blocked by a collision due to a slot format change, a UE may drop (e.g., not transmit or unschedule) the symbols for other repetitions of the SRS repetition or the TD-OCC sequence. For example, as shown by example 1100, if symbol 10 is canceled, the UE may drop transmission in symbol 9. As a result, the UE may save power, processing resources, and signaling resources that would otherwise be wasted by transmitting a signal in symbol 9.

In other words, the repetitions of the SRS resource (SRS 1) in symbols 9 and 10 are repetitions of the same SRS repetition group. The repetition of symbol 10 is canceled or blocked and thus repetition for other symbol 9 of the SRS repetition group may be dropped, being another consecutive repetition of the same SRS repetition group of the SRS resource. One or more other symbols may be dropped if there are other consecutive repetitions for the SRS repetition group, whether earlier (e.g., symbol 8) or later. The UE may continue with transmission of a next SRS repetition group for another SRS resource (SRS 2) in symbols 12 and 13.

As indicated above, FIG. 11 is provided as an example. Other examples may differ from what is described with regard to FIG. 11.

Figure 12:
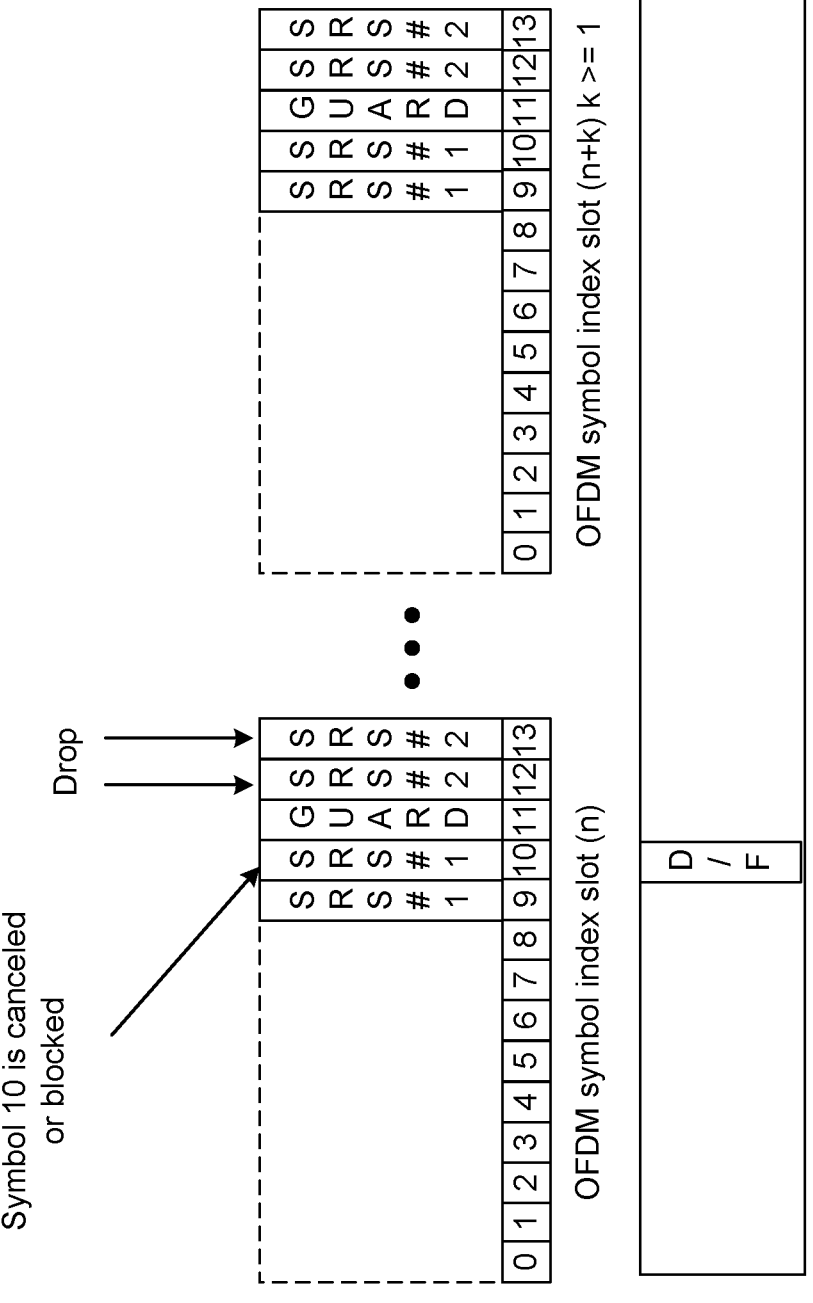
FIG. 12 is a diagram illustrating an example of SRS repetition with a canceled or blocked symbol, in accordance with the present disclosure.

FIG. 12 is a diagram illustrating an example 1200 of SRS repetition with a canceled or blocked symbol, in accordance with the present disclosure.

In some aspects, if symbol 10 is canceled, the UE may drop the transmission of repetitions of remaining SRS repetitions in the same slot after the canceled symbol. Example 1200 shows cancelation of symbol 10 and the dropping of repetitions in symbols 12 and 13, even if they are for another SRS resource (SRS 2). As a result, the UE may save power, processing resources, and signaling resources. In some aspects, the UE may also drop transmission of the repetition of symbol 9.

In some aspects, the UE may transmit repetitions of one or more SRS repetitions in the slot until transmission of the SRS resource is complete. This may include transmitting repetitions of one or more SRS repetitions for the SRS resource in one or more other slots, consecutive or non-consecutive, as necessary to complete the SRS repetitions for the SRS resource. In some aspects, the UE may continue to transmit repetitions until a quantity of unblocked or available repetitions and/or slots satisfies a repetition size threshold. For example, if the repetition size threshold is 4, 4 repetitions of the SRS resource are to be received by the base station to complete the SRS repetitions of the SRS resource.

In some aspects, the UE may transmit repetitions of the one or more SRS repetitions only in semi-static uplink slots until transmission of the SRS resource is complete. In other words, the UE may conserve processing resources by not determining how to handle repetitions with a mixed slot format or a canceled symbol and waiting until a fully uplink slot is available before transmitting any remaining repetitions of an SRS resource.

In some aspects, if a collision happens for an SRS resource belonging to an SRS resource set, the UE may drop all repetitions for this SRS resource set. The collision may be an implicit indication of cancellation by the base station. Afterwards, the UE may not transmit dropped repetitions for the SRS, or the UE may transmit repetitions of the SRS resource in a next slot, or wherever there is availability for the repetitions of the SRS resource.

In some aspects, the UE may transmit repetitions of the SRS resource and stop transmitting the repetitions when the expected quantity of repetitions per SRS resource is satisfied (expected number of repetitions transmitted by the UE or expected number of repetitions received by the base station). That is, the UE does not wait until all repetitions of the SRS resource fit within a slot or an SRS repetition fits within a slot. For example, if an expected quantity of inter-slot repetitions is 4 and an expected quantity of intra-slot repetitions is 4, the UE may transmit 16 symbols. If, within the next 16 slots, there is only 1 symbol that fits into the slot for a given SRS resource, then the UE may use 16 slots to sound the SRS resource on the antenna ports, because the expected quantity of sounding may be 16 symbols for the ports of the SRS resource.

As indicated above, FIG. 12 is provided as an example. Other examples may differ from what is described with regard to FIG. 12.

Figure 13:
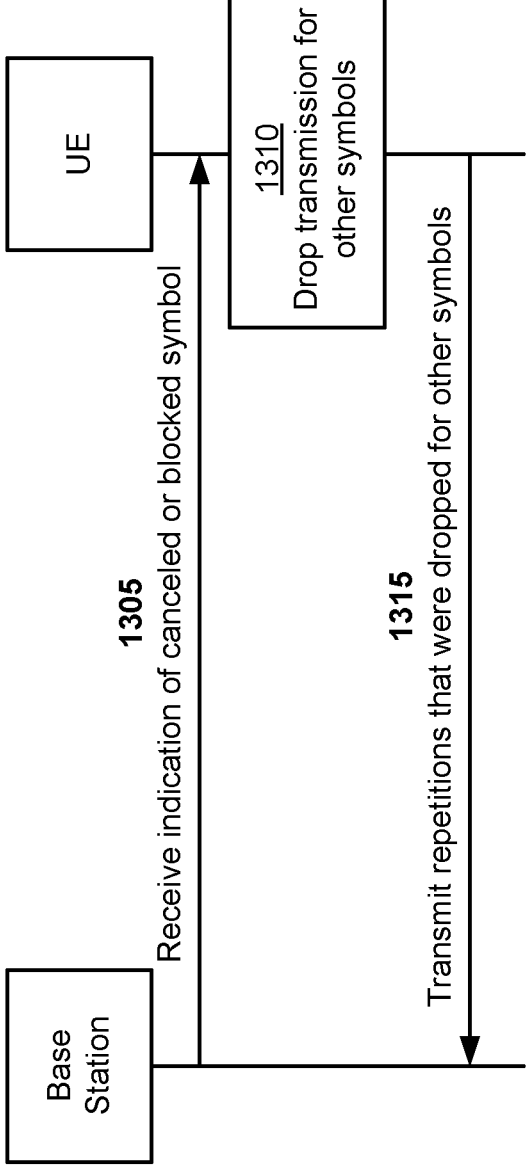
FIG. 13 is a diagram illustrating an example of SRS repetition with a canceled or blocked symbol, in accordance with the present disclosure.

FIG. 13 is a diagram illustrating an example 1300 of SRS repetition with a canceled or blocked symbol, in accordance with the present disclosure. As shown in FIG. 13, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 1305, the base station may transmit an indication that a symbol is canceled or blocked. Cancelation may be indicated by a ULCI for the symbol. A block may be indicated by an SFI indicating a direction change for the symbol. The blocked or canceled symbol may prevent transmission of a repetition for an SRS resource.

As shown by reference number 1310, the UE may drop other repetitions for the SRS repetition group and/or for the rest of the slot. If the canceled or blocked symbol splits repetitions into two or more groups of repetitions, the UE may transmit the group of repetitions with the greatest number of repetitions.

As shown by reference number 1315, the UE may transmit repetitions that were dropped for other symbols, in order to complete transmission of the SRS resource or to satisfy an expected quantity of repetitions for the SRS resource.

As indicated above, FIG. 13 is provided as an example. Other examples may differ from what is described with regard to FIG. 13.

Figure 14:
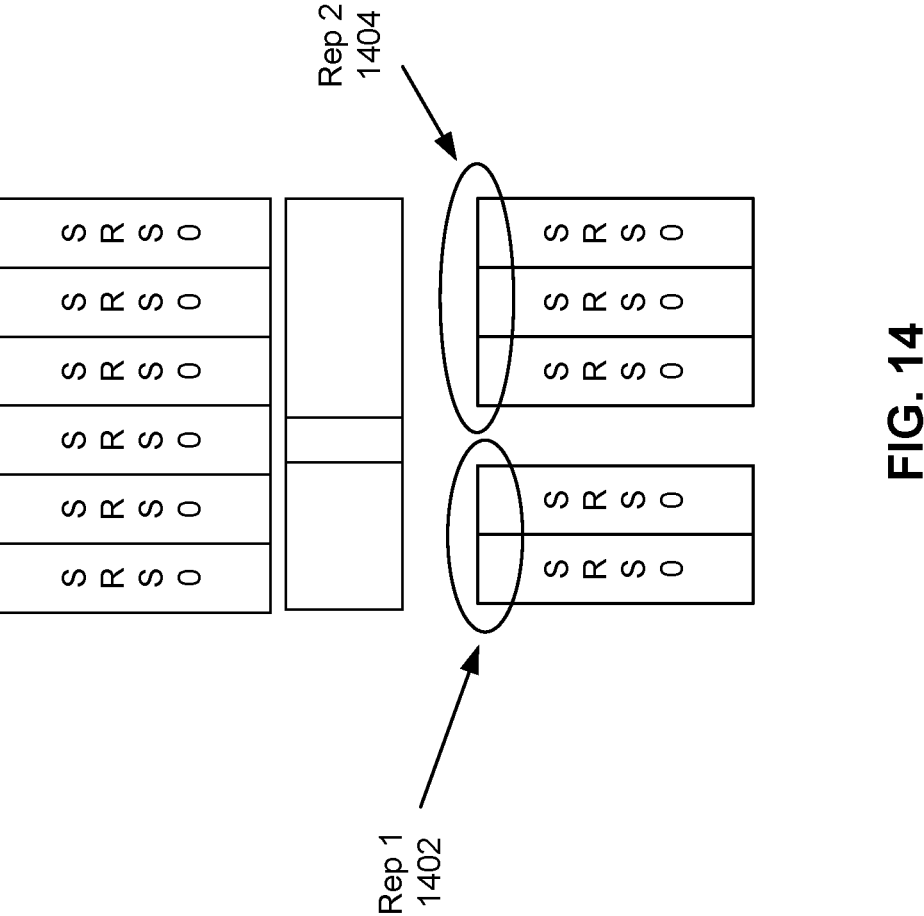
FIG. 14 is a diagram illustrating an example of SRS repetition with a canceled or blocked symbol, in accordance with the present disclosure.

FIG. 14 is a diagram illustrating an example 1400 of SRS repetition with a canceled or blocked symbol, in accordance with the present disclosure.

Example 1400 shows an SRS repetition with a size of 6 repetitions. If a third symbol or repetition is canceled, there is a first group of repetitions with a size of 2 repetitions (Rep 1) 1402 and a second group of repetitions with a size of 3 repetitions (Rep 2) 1404. The UE may be configured to transmit repetitions for an SRS repetition of a repetition size threshold (e.g., minimum group size), such as 3 repetitions. Rep 1 1402 is 2 repetitions and Rep 2 1404 is 3 repetitions.

If the repetition size threshold is 3, the UE may not transmit repetitions of Rep 1 1402 (they may be dropped), but may transmit repetitions of Rep 2 1404.

In some aspects, the UE may be configured to transmit repetitions for an SRS repetition of a greatest size (and while satisfying the repetition size threshold). If the repetition size threshold is 2 repetitions, both Rep 1 1402 and Rep 2 1404 satisfy the repetition size threshold. However, the UE may transmit the group of repetitions with the greater repetition size. The UE may not transmit repetitions of Rep 1 1402 (they may be dropped), but may transmit repetitions of Rep 2 1404, because the size of Rep 2 1404 is greater than the size of Rep 1 1402. This may allow the base station to multiplex more UEs with the same allocation.

If there are multiple cancelations that split a larger SRS repetition size, the UE may determine which groups of repetitions satisfy the repetition size threshold and transmit the group with a greatest repetition size from among these groups that satisfy the repetition size threshold.

In some aspects, the UE may use a TD-OCC size that is equal to the repetition size of the transmitted group of repetitions. An original matrix may be of size 6×6 (or 5×5). The size of the transmitted matrix may be 3×3, or have an index of 3. Using a size that matches the size of the transmitted group may maintain orthogonality. For example, if a 5×5 matrix is transmitted for Rep 2 1404, the orthogonality may be lost.

As indicated above, FIG. 14 is provided as an example. Other examples may differ from what is described with regard to FIG. 14.

Figure 15:
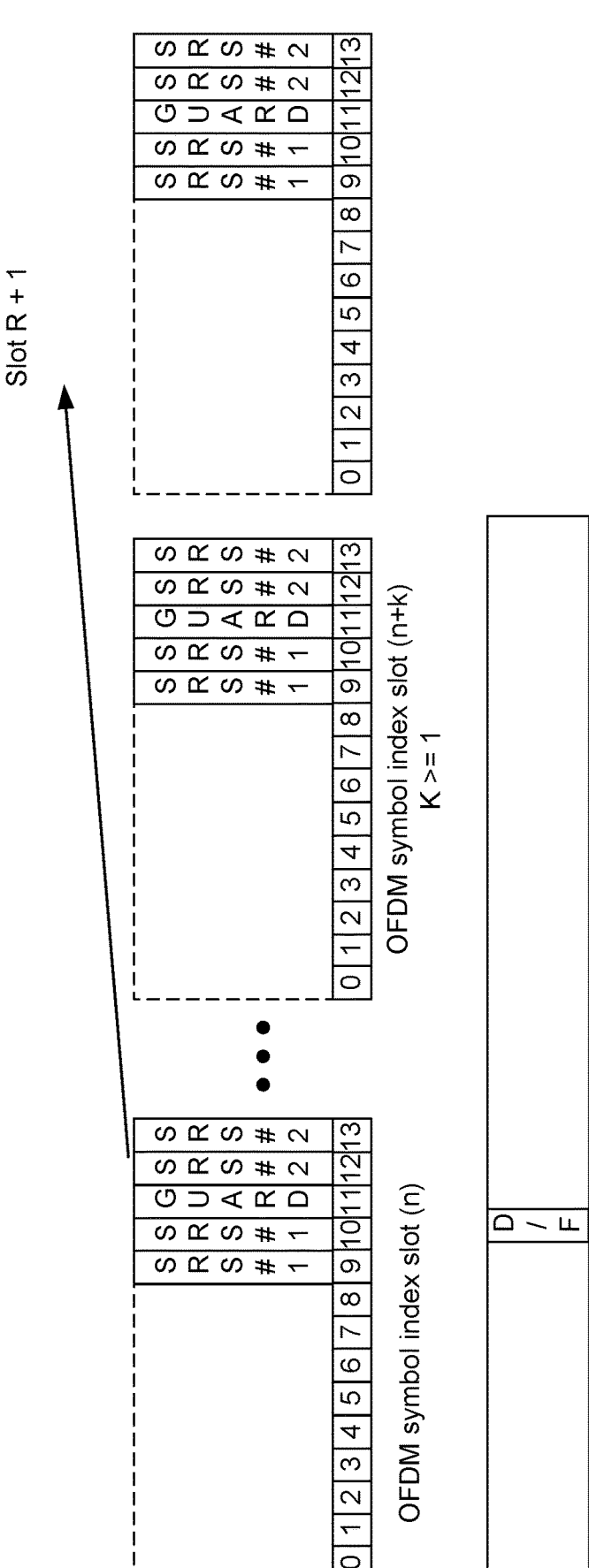
FIG. 15 is a diagram illustrating an example of transmitting an SRS resource, in accordance with the present disclosure.

FIG. 15 is a diagram illustrating an example 1500 of transmitting an SRS resource, in accordance with the present disclosure.

If a collision for a specific SRS resource happens within a slot k, and the repetition is of length R, then the UE may transmit repetitions of the SRS resource entirely at slot R+1. That is, in some aspects, the repetitions for the canceled or blocked symbols will be replaced by repetitions for the entire SRS resource in a next available slot (not just replace the repetitions for the symbols that were canceled or blocked). The UE may search for the next available slot in which the repetitions for the entire SRS resource can be transmitted.

In some aspects, the UE may transmit repetitions for any inter-slot repetition when a collision happens for any slot. Example 1500 shows repetitions of a first SRS resource (SRS 1) and repetitions of a second SRS resource (SRS 2). For example, intra-slot repetition may be 2 symbols and inter-slot repetition may be repetitions for 2 SRS resources per slot. That is, the UE may transmit 4 symbols per SRS resource. If, for example, there is a collision in symbol 9, the UE may continue to try to transmit 4 symbols of the SRS resource. If the UE transmits 1 symbol in symbol 10 of a first slot, there will be 3 symbols left to transmit. The UE may transmit 2 more symbols for the SRS resource in two repetitions of an SRS repetition for the SRS resource in a second slot (symbols 9 and 10 in the second slot), and transmit the fourth symbol in a third slot (symbol 9 of the third slot). In this example, TD-OCC does not apply.

In some aspects, the UE may stop or suspend searching for an available slot, a static uplink slot, a next opportunity to transmit repetitions for blocked or canceled symbols, or stop or suspend any other procedure described in connection with FIGS. 4-15 after expiration of a timer and/or a counter satisfies (reaches) a counter threshold (e.g., maximum or triggering value for the counter). The counter may be, for example, a maximum number of Y slots, sub-slots, symbols, frame, and/or time units. In some aspects, a timer or a counter may be specific to an SRS resource or an SRS resource set. Each SRS resource or SRS resource set may be configured with a timer or counter by which the UE may not consume anymore, time, power, processing resources, and/or signaling resource to send the SRS resource or SRS resources of the SRS resource set.

As indicated above, FIG. 15 is provided as an example. Other examples may differ from what is described with regard to FIG. 15.

Figure 16:
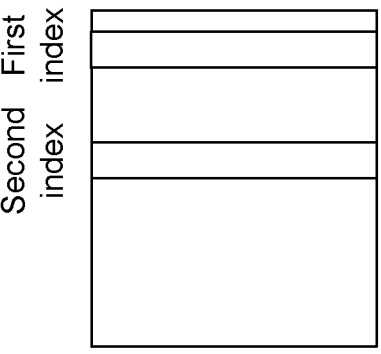
FIG. 16 is a diagram illustrating an example of a matrix index, in accordance with the present disclosure.

FIG. 16 is a diagram illustrating an example 1600 of a matrix index, in accordance with the present disclosure.

The UE may receive a first index from a base station for an OCC matrix of an original repetition size. However, the UE may use a second index for the TD-OCC matrix repetition size, where the second index is smaller than the first index and based at least in part on the first index. Example 1600 shows an OCC matrix with the first index signaled by the base station, in which the UE may use a smaller size matrix with the second index.

For example, the UE may determine a TD-OCC index by shortening the matrix to match a repetition size of a transmitted group of repetitions. This may be a group of repetitions with a greater repetition size. If the base station signals an index for the UE, the UE may use the index with the smaller size TD-OCC matrix. The matrix may be a Walshi matrix, a DFT matrix, a Hadamard matrix, or the like. Example 1600 shows an original OCC matrix, but the UE may use a smaller size matrix.

As indicated above, FIG. 16 is provided as an example. Other examples may differ from what is described with regard to FIG. 16.

Figure 17:
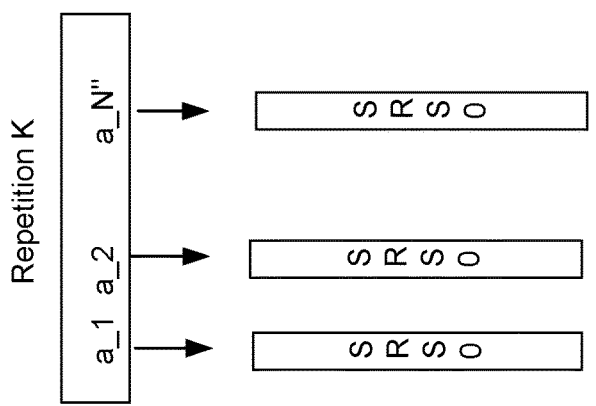
FIG. 17 is a diagram illustrating an example of repetition sizes, in accordance with the present disclosure.
Figure 17:
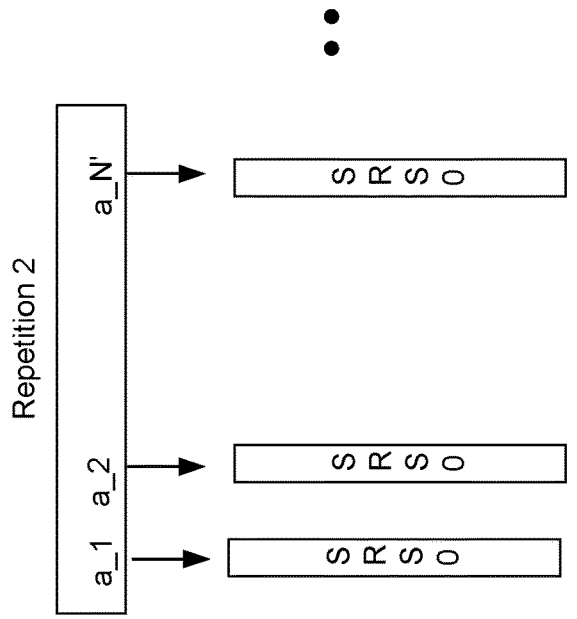
Figure 17:
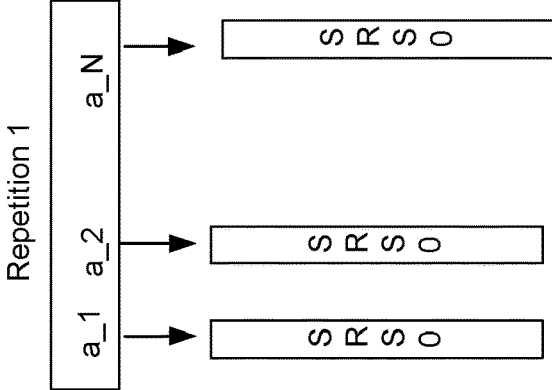

FIG. 17 is a diagram illustrating an example 1700 of repetition sizes, in accordance with the present disclosure.

The UE may allow different OCC lengths, for different repetition sizes, across different repetitions, to support multiple users that share the same resources. Example 1700 shows a TD-OCC size for repetitions of an SRS resource that are N, N', . . . , N". In some aspects, the UE may use a separate TD-OCC index per repetition size, signaled as a row of size K via an RRC message or a MAC CE. In some aspects, the UE may use a common index for all repetition sizes. The base station may ensure that the indices are applicable to the repetitions. The UE may use a modulo operation to obtain a repetition size for indices of different OCC sizes. For example, the UE may select a smaller size as a function of the index and the original size. In some aspects, the UE may use different indices for different repetition sizes. UEs with different repetition sizes may use different indices.

As indicated above, FIG. 17 is provided as an example. Other examples may differ from what is described with regard to FIG. 17.

Figure 18:
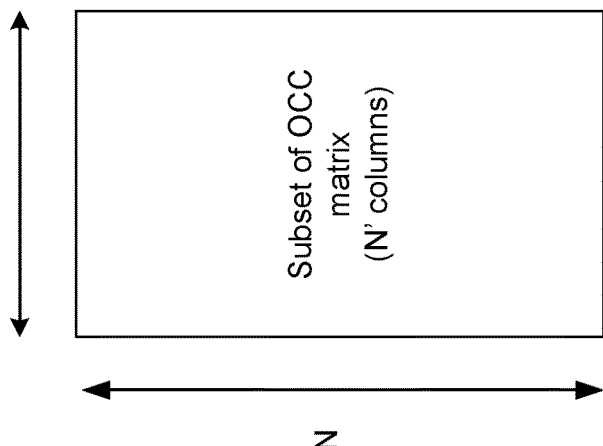
FIG. 18 is a diagram illustrating an example of matrix sizes, in accordance with the present disclosure.
Figure 18:
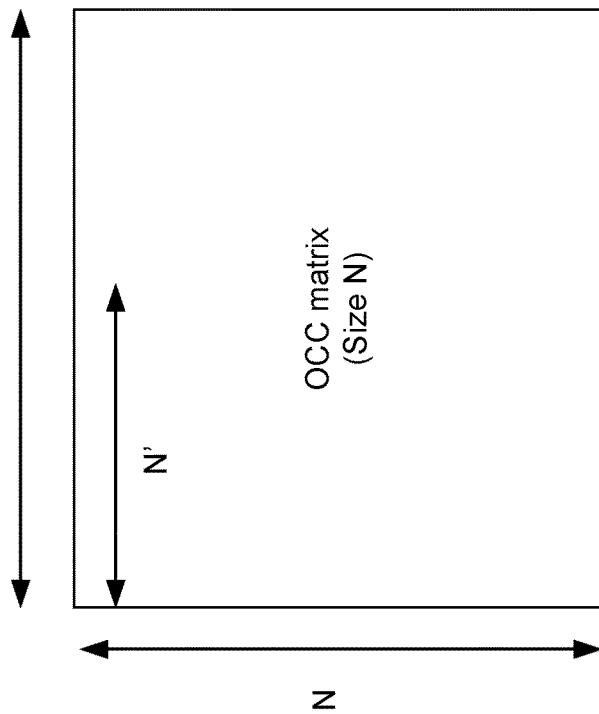

FIG. 18 is a diagram illustrating an example 1800 of matrix sizes, in accordance with the present disclosure.

The UE may down-select from an original OCC matrix based at least in part on repetition sizes that result from a canceled (or blocked) symbol. The UE may select a subset of TD-OCC vectors from an OCC matrix. Example 1800 shows an OCC matrix of size N and a subset of the OCC matrix of size N'. The UE may select N' consecutive columns, with the base station signaling a starting column index. An offset may be predefined per UE to be used with repetitions. The UE may also subsample the TD-OCC vectors. For example, the UE may select N' columns separated by floor(N/') or ceil(N/N') offsets between selected columns. The UE may use a table, where index values correspond to N' bar sizes. The base station may determine and transmit, to the UE, indices that apply to various matrix sizes. The UE may use a modulo operation based at least in part on an N' value such that no two indices are used for the same antenna port. That is, if TD-OCC is used, the base station may determine an appropriate index for a TD-OCC matrix size. The base station may also control a number of users that are sharing a time-frequency resource. The base station may provide information as to which index, table, or operation is used to select a subset of TD-OCC vectors, in response to a canceled symbol. The UE and the base station may also maintain orthogonality with the smaller TD-OCC matrix.

As indicated above, FIG. 18 is provided as an example. Other examples may differ from what is described with regard to FIG. 18.

Figure 19:
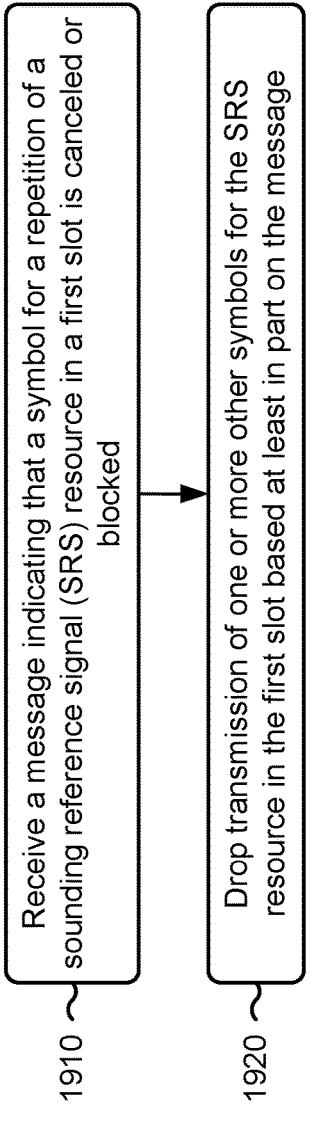
FIG. 19 is a diagram illustrating an example process performed, for example, by a UE, in accordance with the present disclosure.

FIG. 19 is a diagram illustrating an example process 1900 performed, for example, by a UE, in accordance with the present disclosure. Example process 1900 is an example where the UE (e.g., UE 120) performs operations associated with SRS repetition with canceled or blocked symbols.

As shown in FIG. 19, in some aspects, process 1900 may include receiving a message indicating that a symbol for a repetition of an SRS resource in a first slot is canceled or blocked (block 1910). For example, the UE (e.g., using reception component 2102 depicted in FIG. 21) may receive a message indicating that a symbol for a repetition of an SRS resource in a first slot is canceled or blocked, as described above in connection with FIGS. 10-18.

As further shown in FIG. 19, in some aspects, process 1900 may include dropping transmission of one or more other symbols for the SRS resource in the first slot based at least in part on the message (block 1920). For example, the UE (e.g., using repetition component 2108 depicted in FIG. 21) may drop transmission of one or more other symbols for the SRS resource in the first slot based at least in part on the message, as described above in connection with FIGS. 10-18.

Process 1900 may include additional aspects, such as any single aspect or any combination of aspects described below and/or in connection with one or more other processes described elsewhere herein.

In a first aspect, the repetition of the SRS resource is included in an SRS repetition group with other consecutive repetitions of the SRS resource, and the one or more other symbols are for one or more of the other consecutive repetitions of the SRS repetition group.

In a second aspect, alone or in combination with the first aspect, the one or more other symbols are for remaining repetitions for the SRS resource in the first slot.

In a third aspect, alone or in combination with one or more of the first and second aspects, the symbol that is canceled or blocked separates repetitions for the SRS resource into a first group of repetitions and a second group of repetitions, and process 1900 further comprises transmitting one or more of the first group of repetitions or the second group of repetitions that satisfy a repetition size threshold.

In a fourth aspect, alone or in combination with one or more of the first through third aspects, the transmitting includes transmitting the first group based at least in part on a repetition size of the first group being greater than a repetition size of the second group, or transmitting the second group based at least in part on a repetition size of the second group being greater than a repetition size of the first group.

In a fifth aspect, alone or in combination with one or more of the first through fourth aspects, process 1900 includes using a TD-OCC matrix repetition size that is equal to a repetition size of whichever of the one or more of the first group of repetitions or the second group of repetitions is transmitted.

In a sixth aspect, alone or in combination with one or more of the first through fifth aspects, process 1900 includes receiving a first index for an OCC matrix of an original repetition size, and using a second index for the TD-OCC matrix repetition size, where the second index is smaller than the first index and based at least in part on the first index.

In a seventh aspect, alone or in combination with one or more of the first through sixth aspects, process 1900 includes using different indices for different repetition sizes.

In an eighth aspect, alone or in combination with one or more of the first through seventh aspects, process 1900 includes using a common index for each repetition size.

In a ninth aspect, alone or in combination with one or more of the first through eighth aspects, an OCC matrix to be used for transmitting repetitions has multiple TD-OCC vectors, and process 1900 further comprises selecting a subset of the TD-OCC vectors from the OCC matrix based at least in part on a received starting column index, a predefined offset, or matrix columns that are selected by subsampling.

In a tenth aspect, alone or in combination with one or more of the first through ninth aspects, process 1900 includes transmitting repetitions of the SRS resource for the dropped one or more other symbols in one or more of the first slot or one or more later slots until transmission of the SRS resource is complete.

In an eleventh aspect, alone or in combination with one or more of the first through tenth aspects, process 1900 includes transmitting repetitions of the SRS resource for the dropped one or more other symbols in semi-static uplink slots until transmission of the SRS resource is complete.

In a twelfth aspect, alone or in combination with one or more of the first through eleventh aspects, the dropping includes dropping transmission of one or more other symbols associated with an SRS resource set that includes the SRS resource.

In a thirteenth aspect, alone or in combination with one or more of the first through twelfth aspects, process 1900 includes transmitting repetitions of the SRS resource for the dropped one or more other symbols in a second slot. In some aspects, process 1900 includes transmitting all repetitions of the SRS resources in the second slot.

In a fourteenth aspect, alone or in combination with one or more of the first through thirteenth aspects, process 1900 includes transmitting repetitions of the SRS resource for the dropped one or more other symbols until an expected quantity of repetitions for the SRS resource have been transmitted.

In a fifteenth aspect, alone or in combination with one or more of the first through fourteenth aspects, process 1900 includes transmitting repetitions of the SRS resource for the dropped one or more other symbols or searching for available slots for repetitions of the SRS resource until a timer expires or until a counter satisfies a counter threshold.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
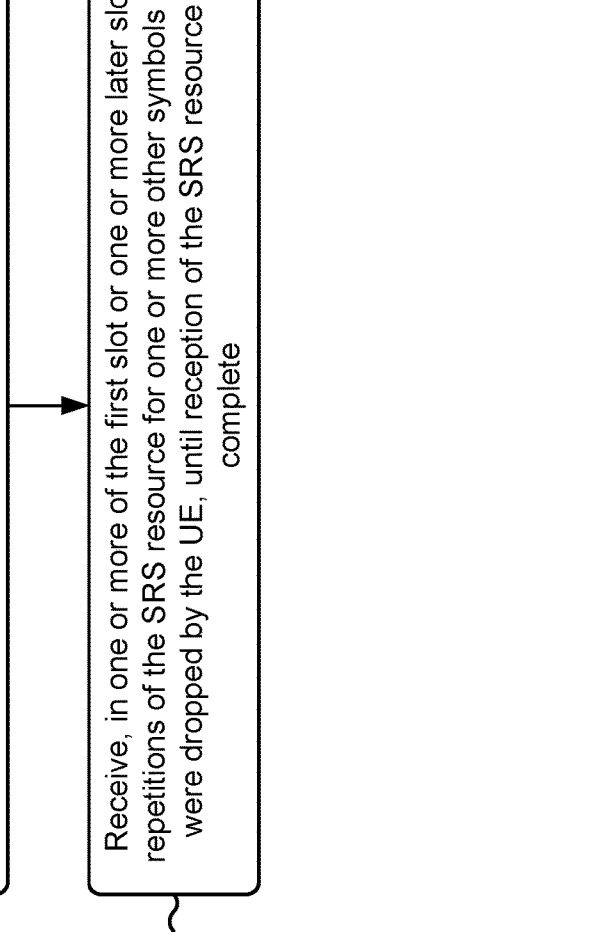
FIG. 20 is a diagram illustrating an example process performed, for example, by a network entity, in accordance with the present disclosure.

FIG. 20 is a diagram illustrating an example process 2000 performed, for example, by a network entity, in accordance with the present disclosure. Example process 2000 is an example where the network entity (e.g., base station 110) performs operations associated with SRS repetition with canceled or blocked symbol.

As shown in FIG. 20, in some aspects, process 2000 may include transmitting, to a UE, a message indicating that a symbol for a repetition of an SRS resource in a first slot is canceled or blocked (block 2010). For example, the network entity (e.g., using transmission component 2204, depicted in FIG. 22) may transmit, to a UE, a message indicating that a symbol for a repetition of an SRS resource in a first slot is canceled or blocked, as described above in connection with FIGS. 10-18.

As further shown in FIG. 20, in some aspects, process 2000 may include receiving, in one or more of the first slot or one or more later slots, repetitions of the SRS resource for one or more other symbols that were dropped by the UE, until reception of the SRS resource is complete (block 2020). For example, the network entity (e.g., using reception component 2202 depicted in FIG. 22) may receive, in one or more of the first slot or one or more later slots, repetitions of the SRS resource for one or more other symbols that were dropped by the UE, until reception of the SRS resource is complete, as described above in connection with FIGS. 10-18.

Process 2000 may include additional aspects, such as any single aspect or any combination of aspects described below and/or in connection with one or more other processes described elsewhere herein.

In a first aspect, the repetition of the SRS resource is included in an SRS repetition group with other consecutive repetitions of the SRS resource, and the one or more other symbols are for one or more of the other consecutive repetitions of the SRS repetition group.

In a second aspect, alone or in combination with the first aspect, the one or more other symbols are for remaining repetitions for the SRS resource in the first slot.

In a third aspect, alone or in combination with one or more of the first and second aspects, the symbol that is canceled or blocked separates repetitions for the SRS resource into a first group of repetitions and a second group of repetitions, and the receiving includes receiving one or more of the first group of repetitions or the second group of repetitions that satisfy a repetition size threshold.

In a fourth aspect, alone or in combination with one or more of the first through third aspects, the receiving includes receiving whichever of the one or more of the first group of repetitions or the second group of repetitions has a greater repetition size.

In a fifth aspect, alone or in combination with one or more of the first through fourth aspects, process 2000 includes processing received repetitions with a TD-OCC matrix repetition size that is equal to a repetition size of whichever of the one or more of the first group of repetitions or the second group of repetitions is transmitted.

In a sixth aspect, alone or in combination with one or more of the first through fifth aspects, process 2000 includes transmitting a first index for an OCC matrix of an original repetition size, and receiving repetitions with a second index that corresponds to the TD-OCC matrix repetition size, where the second index is smaller than the first index.

In a seventh aspect, alone or in combination with one or more of the first through sixth aspects, process 2000 includes using different indices for different repetition sizes.

In an eighth aspect, alone or in combination with one or more of the first through seventh aspects, process 2000 includes using a common index for each repetition size.

24

In a ninth aspect, alone or in combination with one or more of the first through eighth aspects, process 2000 includes using different orthogonal cover code repetition sizes for groups of repetitions from different UEs.

In a tenth aspect, alone or in combination with one or more of the first through ninth aspects, the receiving includes receiving repetitions of the SRS resource for the dropped one or more other symbols in semi-static uplink slots.

In an eleventh aspect, alone or in combination with one or more of the first through tenth aspects, process 2000 includes receiving repetitions of the SRS resource for the dropped one or more other symbols until an expected quantity of repetitions for the SRS resource is satisfied.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
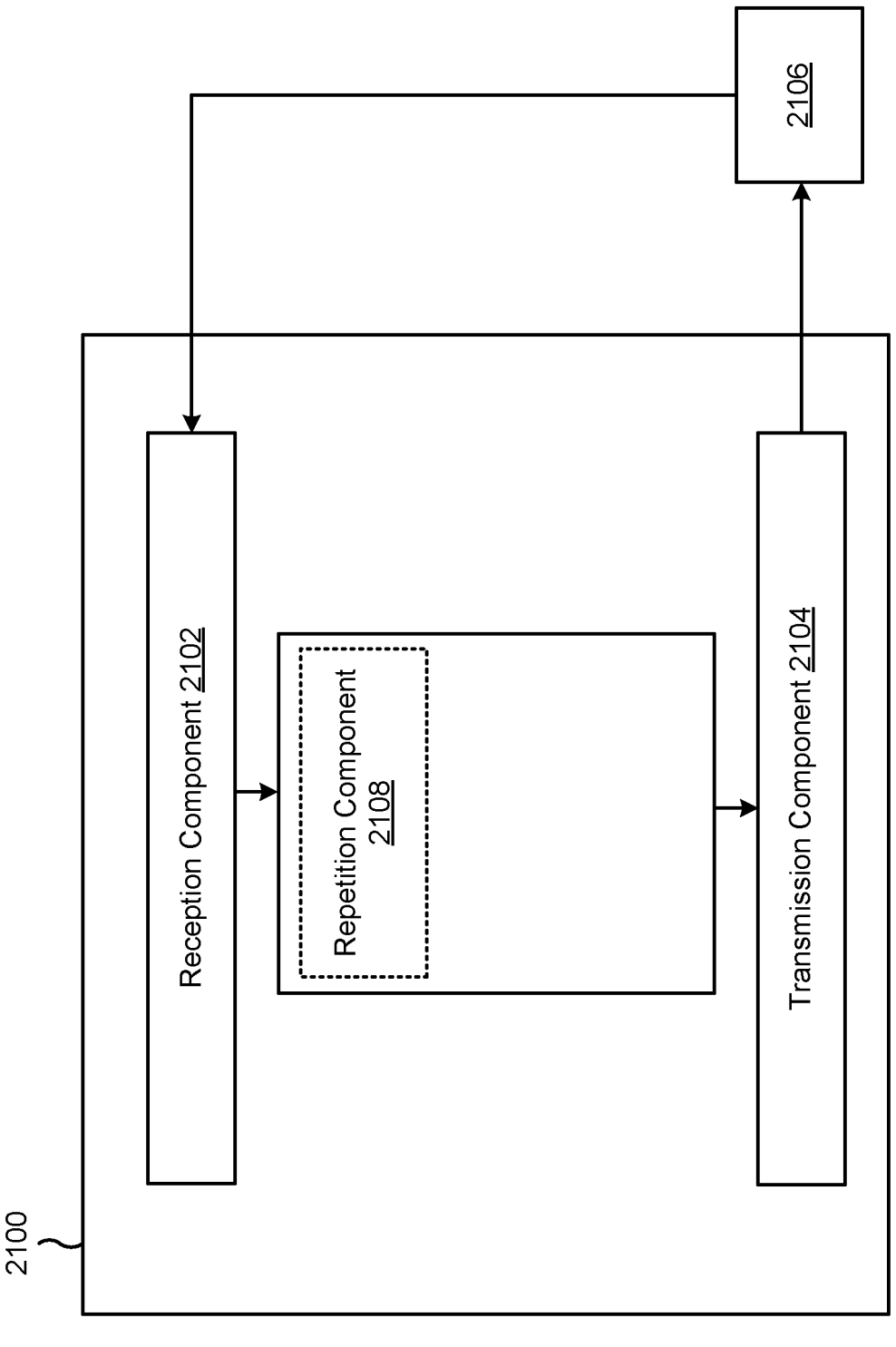
FIGS. 21-22 are block diagrams of example apparatuses for wireless communication, in accordance with the present disclosure.

FIG. 21 is a block diagram of an example apparatus 2100 for wireless communication. The apparatus 2100 may be a UE, or a UE may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include a repetition component 2108, among other examples.

In some aspects, the apparatus 2100 may be configured to perform one or more operations described herein in connection with FIGS. 1-18. Additionally, or alternatively, the apparatus 2100 may be configured to perform one or more processes described herein, such as process 1900 of FIG. 19. In some aspects, the apparatus 2100 and/or one or more components shown in FIG. 21 may include one or more components of the UE described above in connection with FIG. 2. Additionally, or alternatively, one or more components shown in FIG. 21 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a demodulator, a MIMO detector, a receive processor, a controller/processor, a memory, or a combination thereof, of the UE described above in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering. amplification, modulation, digital-to-analog conversion, multiplexing, interleaving, mapping, or encoding. among other examples), and may transmit the processed signals to the apparatus 2106. In some aspects, the transmission component 2104 may include one or more antennas, a modulator, a transmit MIMO processor, a transmit processor, a controller/processor, a memory, or a combination thereof, of the UE described above in connection with FIG. 2. In some aspects, the transmission component 2104 may be co-located with the reception component 2102 in a transceiver.

The reception component 2102 may receive a message indicating that a symbol for a repetition of an SRS resource in a first slot is canceled or blocked. The repetition component 2108 may drop transmission of one or more other symbols for the SRS resource in the first slot based at least in part on the message.

The repetition component 2108 may use a TD-OCC matrix repetition size that is equal to a repetition size of whichever of the one or more of the first group of repetitions or the second group of repetitions is transmitted. The reception component 2102 may receive a first index for an OCC matrix of an original repetition size. The repetition component 2108 may use a second index for the TD-OCC matrix repetition size, where the second index is smaller than the first index and based at least in part on the first index. The repetition component 2108 may use different indices for different repetition sizes. The repetition component 2108 may use a common index for each repetition size.

The transmission component 2104 may transmit repetitions of the SRS resource for the dropped one or more other symbols in one or more of the first slot or one or more later slots until transmission of the SRS resource is complete. The transmission component 2104 may transmit repetitions of the SRS resource for the dropped one or more other symbols in semi-static uplink slots until transmission of the SRS resource is complete. The transmission component 2104 may transmit repetitions of the SRS resource for the dropped one or more other symbols in a second slot. The transmission component 2104 may transmit repetitions of the SRS resource for the dropped one or more other symbols until an expected quantity of repetitions for the SRS resource have been transmitted. The transmission component 2104 may transmit repetitions of the SRS resource for the dropped one or more other symbols or to search for available slots for repetitions of the SRS resource until a timer expires or until a counter satisfies a counter threshold.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
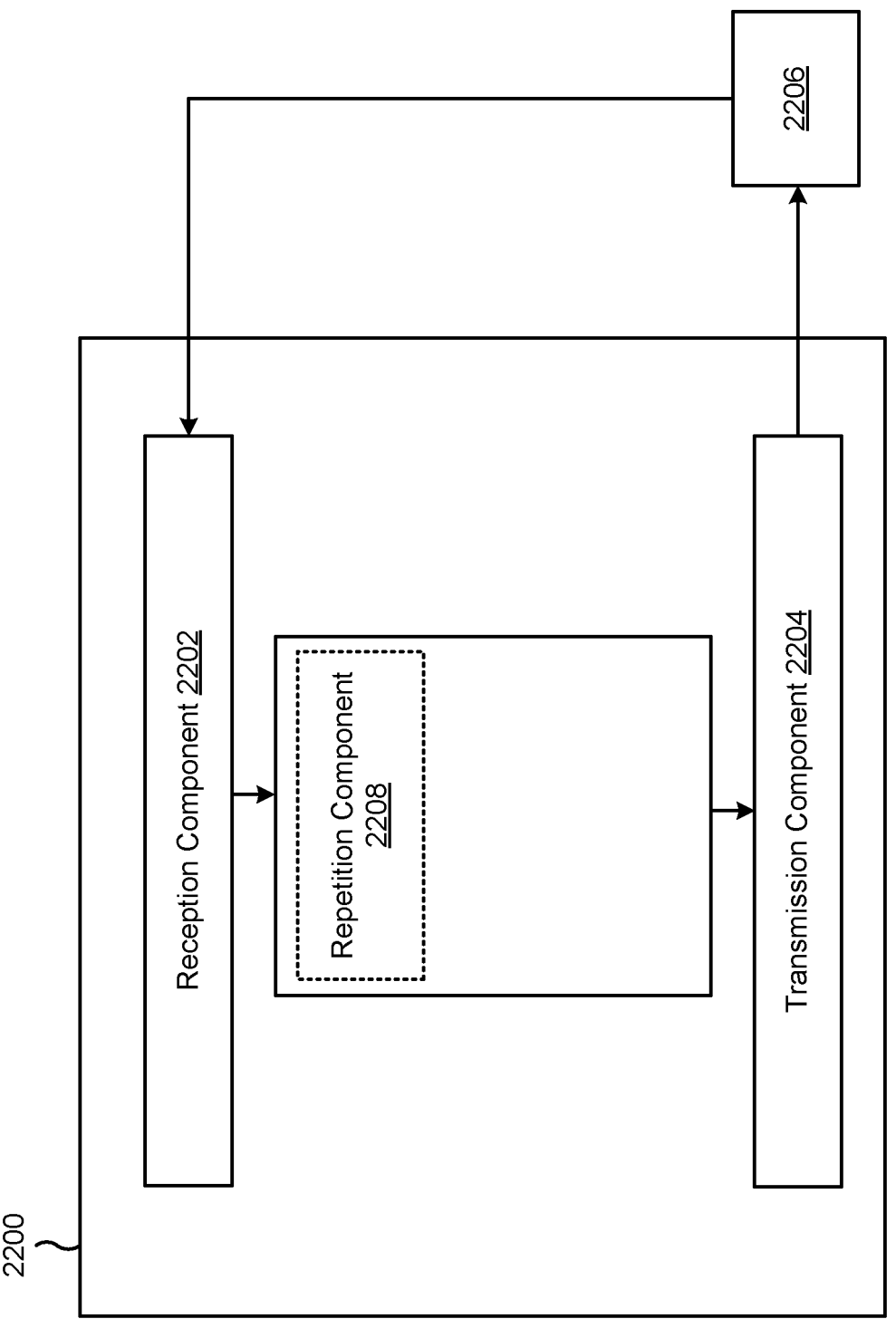

FIG. 22 is a block diagram of an example apparatus 2200 for wireless communication. The apparatus 2200 may be a base station, or a base station may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include a repetition component 2208, among other examples.

In some aspects, the apparatus 2200 may be configured to perform one or more operations described herein in connection with FIGS. 1-18. Additionally, or alternatively, the apparatus 2200 may be configured to perform one or more processes described herein, such as process 2000 of FIG. 20. In some aspects, the apparatus 2200 and/or one or more components shown in FIG. 22 may include one or more components of the base station described above in connection with FIG. 2. Additionally, or alternatively, one or more components shown in FIG. 22 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a demodulator, a MIMO detector, a receive processor, a controller/processor, a memory, or a combination thereof, of the base station described above in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modulator, a transmit MIMO processor, a transmit processor, a controller/processor, a memory, or a combination thereof, of the base station described above in connection with FIG. 2. In some aspects, the transmission component 2204 may be co-located with the reception component 2202 in a transceiver.

The transmission component 2204 may transmit, to a UE, a message indicating that a symbol for a repetition of an SRS resource in a first slot is canceled or blocked. The reception component 2202 may receive, in one or more of the first slot or one or more later slots, repetitions of the SRS resource for one or more other symbols that were dropped by the UE, until reception of the SRS resource is complete.

The repetition component 2208 may process received repetitions with a TD-OCC matrix repetition size that is equal to a repetition size of whichever of the one or more of the first group of repetitions or the second group of repetitions is transmitted. The transmission component 2204 may transmit a first index for an OCC matrix of an original repetition size.

The reception component 2202 may receive repetitions with a second index that corresponds to the TD-OCC matrix repetition size, where the second index is smaller than the first index.

The repetition component 2208 may use different indices for different repetition sizes. The repetition component 2208 may use a common index for each repetition size. The repetition component 2208 may use different orthogonal cover code repetition sizes for groups of repetitions from different UEs.

The reception component 2202 may receive repetitions of the SRS resource for the dropped one or more other symbols until an expected quantity of repetitions for the SRS resource is satisfied.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some Aspects of the present disclosure:

Aspect 1: A method of wireless communication performed by a user equipment (UE), comprising: receiving a message indicating that a symbol for a repetition of a sounding reference signal (SRS) resource in a first slot is canceled or blocked: and dropping transmission of one or more other symbols for the SRS resource in the first slot based at least in part on the message.

Aspect 2: The method of Aspect 1, wherein the repetition of the SRS resource is included in an SRS repetition group with other consecutive repetitions of the SRS resource, and wherein the one or more other symbols are for one or more of the other consecutive repetitions of the SRS repetition group.

Aspect 3: The method of Aspect 1 or 2, wherein the one or more other symbols are for remaining repetitions for the SRS resource in the first slot.

Aspect 4: The method of any of Aspects 1-3, wherein the symbol that is canceled or blocked separates repetitions for the SRS resource into a first group of repetitions and a second group of repetitions, and wherein the method further comprises transmitting one or more of the first group of repetitions or the second group of repetitions that satisfy a repetition size threshold.

Aspect 5: The method of Aspect 4, wherein the transmitting includes transmitting the first group based at least in part on a repetition size of the first group being greater than a repetition size of the second group, or transmitting the second group based at least in part on a repetition size of the second group being greater than a repetition size of the first group.

Aspect 6: The method of Aspect 4, further comprising using a time domain orthogonal cover code (TD-OCC) matrix repetition size that is equal to a repetition size of whichever of the one or more of the first group of repetitions or the second group of repetitions is transmitted.

Aspect 7: The method of Aspect 6, further comprising: receiving a first index for an OCC matrix of an original repetition size: and using a second index for the TD-OCC matrix repetition size, wherein the second index is smaller than the first index and based at least in part on the first index.

Aspect 8: The method of Aspect 7, further comprising using different indices for different repetition sizes.

Aspect 9: The method of Aspect 7, further comprising using a common index for each repetition size.

Aspect 10: The method of Aspect 4, wherein an OCC matrix to be used for transmitting repetitions has multiple TD-OCC vectors, and wherein the method further comprises selecting a subset of the TD-OCC vectors from the OCC matrix based at least in part on a received starting column index, a predefined offset, or matrix columns that are selected by subsampling.

Aspect 11: The method of any of Aspects 1-10, further comprising transmitting repetitions of the SRS resource for the dropped one or more other symbols in one or more of the first slot or one or more later slots until transmission of the SRS resource is complete.

Aspect 12: The method of any of Aspects 1-11, further comprising transmitting repetitions of the SRS resource for the dropped one or more other symbols in semi-static uplink slots until transmission of the SRS resource is complete.

Aspect 13: The method of any of Aspects 1-12, wherein the dropping includes dropping transmission of one or more other symbols associated with an SRS resource set that includes the SRS resource.

Aspect 14: The method of any of Aspects 1-13, further comprising transmitting all repetitions of the SRS resource in a second slot.

Aspect 15: The method of any of Aspects 1-14, further comprising transmitting repetitions of the SRS resource for the dropped one or more other symbols until an expected quantity of repetitions for the SRS resource have been transmitted.

Aspect 16: The method of any of Aspects 1-15, further comprising transmitting repetitions of the SRS resource for the dropped one or more other symbols or to search for available slots for repetitions of the SRS resource until a timer expires or until a counter satisfies a counter threshold.

Aspect 17: A method of wireless communication performed by a network entity, comprising: transmitting, to a user equipment (UE), a message indicating that a symbol for a repetition of a sounding reference signal (SRS) resource in a first slot is canceled or blocked; and receiving, in one or more of the first slot or one or more later slots, repetitions of the SRS resource for one or more other symbols that were dropped by the UE, until reception of the SRS resource is complete.

Aspect 18: The method of Aspect 17, wherein the repetition of the SRS resource is included in an SRS repetition group with other consecutive repetitions of the SRS resource, and wherein the one or more other symbols are for one or more of the other consecutive repetitions of the SRS repetition group.

Aspect 19: The method of Aspect 17 or 18, wherein the one or more other symbols are for remaining repetitions for the SRS resource in the first slot.

Aspect 20: The method of any of Aspects 17-19, wherein the symbol that is canceled or blocked separates repetitions for the SRS resource into a first group of repetitions and a second group of repetitions, and wherein the receiving includes receiving one or more of the first group of repetitions or the second group of repetitions that satisfy a repetition size threshold.

Aspect 21: The method of Aspect 20, wherein the receiving includes receiving whichever of the one or more of the first group of repetitions or the second group of repetitions has a greater repetition size.

Aspect 22: The method of Aspect 20, further comprising processing received repetitions with a time domain orthogonal cover code (TD-OCC) matrix repetition size that is equal to a repetition size of whichever of the one or more of the first group of repetitions or the second group of repetitions is transmitted.

Aspect 23: The method of Aspect 22, further comprising: transmitting a first index for an OCC matrix of an original repetition size: and receiving repetitions with a second index that corresponds to the TD-OCC matrix repetition size, wherein the second index is smaller than the first index.

Aspect 24: The method of Aspect 23, further comprising using different indices for different repetition sizes.

Aspect 25: The method of Aspect 23, further comprising using a common index for each repetition size.

Aspect 26: The method of any of Aspects 17-25, further comprising using different orthogonal cover code repetition sizes for groups of repetitions from different UEs.

Aspect 27: The method of any of Aspects 17-26, wherein the receiving includes receiving repetitions of the SRS resource for the dropped one or more other symbols in semi-static uplink slots.

Aspect 28: The method of any of Aspects 17-27, further comprising receiving repetitions of the SRS resource for the dropped one or more other symbols until an expected quantity of repetitions for the SRS resource is satisfied.

Aspect 29: An apparatus for wireless communication at a device, comprising a processor: memory coupled with the processor: and instructions stored in the memory and executable by the processor to cause the apparatus to perform the method of one or more Aspects of Aspects 1-28.

Aspect 30: A device for wireless communication, comprising a memory and one or more processors coupled to the memory, the one or more processors configured to perform the method of one or more Aspects of Aspects 1-28.

Aspect 31: An apparatus for wireless communication, comprising at least one means for performing the method of one or more Aspects of Aspects 1-28.

Aspect 32: A non-transitory computer-readable medium storing code for wireless communication, the code comprising instructions executable by a processor to perform the method of one or more Aspects of Aspects 1-28.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-28.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

memory; and one or more processors, coupled to the memory, configured to:

receive a message indicating that a symbol for a repetition of a sounding reference signal (SRS) resource in a first slot is canceled or blocked; and drop transmission of one or more other symbols for the SRS resource in the first slot based at least in part on the message; wherein the symbol that is canceled or blocked separates repetitions for the SRS resource into a first group of repetitions and a second group of repetitions, and wherein the one or more processors are configured to transmit one or more of the first group of repetitions or the second group of repetitions that satisfy a repetition size threshold.

2. The UE of claim 1, wherein the repetition of the SRS resource is included in an SRS repetition group with other consecutive repetitions of the SRS resource, and wherein the one or more other symbols are for one or more of the other consecutive repetitions of the SRS repetition group.

3. The UE of claim 1, wherein the one or more other symbols are for remaining repetitions for the SRS resource in the first slot.

4. The UE of claim 1, wherein the one or more processors are configured to transmit the first group based at least in part on a repetition size of the first group being greater than a repetition size of the second group, or transmit the second group based at least in part on a repetition size of the second group being greater than a repetition size of the first group.

5. The UE of claim 1, wherein the one or more processors are configured to use a time domain orthogonal cover code (TD-OCC) matrix repetition size that is equal to a repetition size of whichever of the one or more of the first group of repetitions or the second group of repetitions is transmitted.

6. The UE of claim 5, wherein the one or more processors are configured to:

receive a first index for an OCC matrix of an original repetition size; and use a second index for the TD-OCC matrix repetition size, wherein the second index is smaller than the first index and based at least in part on the first index.

7. The UE of claim 6, wherein the one or more processors are configured to use different indices for different repetition sizes.

8. The UE of claim 6, wherein the one or more processors are configured to use a common index for each repetition size.

9. The UE of claim 1, wherein an OCC matrix to be used for transmitting repetitions has multiple TD-OCC vectors, and wherein the one or more processors are configured to select a subset of the TD-OCC vectors from the OCC matrix based at least in part on a received starting column index, a predefined offset, or matrix columns that are selected by subsampling.

10. The UE of claim 1, wherein the one or more processors are configured to transmit repetitions of the SRS resource for the one or more other symbols in one or more of the first slot or one or more later slots until transmission of the SRS resource is complete.

11. The UE of claim 1, wherein one or more processors are configured to transmit repetitions of the SRS resource for the one or more other symbols in semi-static uplink slots until transmission of the SRS resource is complete.

12. The UE of claim 1, wherein the one or more processors are configured to drop transmission of one or more other symbols associated with an SRS resource set that includes the SRS resource.

13. The UE of claim 1, wherein the one or more processors are configured to transmit all repetitions of the SRS resource in a second slot.

14. The UE of claim 1, wherein the one or more processors are configured to transmit repetitions of the SRS resource for the one or more other symbols until an expected quantity of repetitions for the SRS resource have been transmitted.

15. The UE of claim 1, wherein the one or more processors are configured to transmit repetitions of the SRS resource for the one or more other symbols or to search for available slots for repetitions of the SRS resource until a timer expires or until a counter satisfies a counter threshold.

16. A network entity for wireless communication, comprising:

memory; and one or more processors, coupled to the memory, configured to:

transmit a message indicating that a symbol for a repetition of a sounding reference signal (SRS) resource in a first slot is canceled or blocked; and receive, in one or more of the first slot or one or more later slots, repetitions of the SRS resource for one or more other symbols that were dropped by a user equipment (UE), until reception of the SRS resource is complete; wherein the symbol that is canceled or blocked separates repetitions for the SRS resource into a first group of repetitions and a second group of repetitions, and wherein the one or more processors are configured to receive one or more of the first group of repetitions or the second group of repetitions that satisfy a repetition size threshold.

17. The network entity of claim 16, wherein the repetition of the SRS resource is included in an SRS repetition group with other consecutive repetitions of the SRS resource, and wherein the one or more other symbols are for one or more of the other consecutive repetitions of the SRS repetition group.

18. The network entity of claim 16, wherein the one or more other symbols are for remaining repetitions for the SRS resource in the first slot.

19. The network entity of claim 16, wherein the one or more processors are configured to receive whichever of the one or more of the first group of repetitions or the second group of repetitions has a greater repetition size.

20. The network entity of claim 16, wherein the one or more processors are configured to process received repetitions with a time domain orthogonal cover code (TD-OCC) matrix repetition size that is equal to a repetition size of whichever of the one or more of the first group of repetitions or the second group of repetitions is transmitted.

21. The network entity of claim 20, wherein the one or more processors are configured to:

transmit a first index for an OCC matrix of an original repetition size; and receive repetitions with a second index that corresponds to the TD-OCC matrix repetition size, wherein the second index is smaller than the first index.

22. The network entity of claim 21, wherein the one or more processors are configured to use different indices for different repetition sizes.

23. The network entity of claim 21, wherein the one or more processors are configured to use a common index for each repetition size.

24. The network entity of claim 16, wherein the one or more processors are configured to use different orthogonal cover code repetition sizes for groups of repetitions from different UEs.

25. The network entity of claim 16, wherein the one or more processors are configured to receive repetitions of the SRS resource for the one or more other symbols in semi-static uplink slots.

26. The network entity of claim 16, wherein the one or more processors are configured to receive repetitions of the SRS resource for the one or more other symbols until an expected quantity of repetitions for the SRS resource is satisfied.

27. A method of wireless communication performed by a user equipment (UE), comprising:

receiving a message indicating that a symbol for a rep-etition of a sounding reference signal (SRS) resource in a first slot is canceled or blocked; and dropping transmission of one or more other symbols for the SRS resource in the first slot based at least in part on the message; wherein the symbol that is canceled or blocked separates repetitions for the SRS resource into a first group of repetitions and a second group of repetitions, and wherein the method further comprises transmitting one or more of the first group of repetitions or the second group of repetitions that satisfy a repeti-tion size threshold.

28. A method of wireless communication performed by a network entity, comprising:

transmitting a message indicating that a symbol for a repetition of a sounding reference signal (SRS) resource in a first slot is canceled or blocked; and receiving, in one or more of the first slot or one or more later slots, repetitions of the SRS resource for one or more other symbols that were dropped by a user equipment (UE), until reception of the SRS resource is complete; wherein the symbol that is canceled or blocked separates repetitions for the SRS resource into a first group of repetitions and a second group of repetitions, and wherein the method further comprises receiving one or more of the first group of repetitions or the second group of repetitions that satisfy a repeti-tion size threshold.

* * * * *